US012448359B2

(12) United States Patent
Chopra et al.

(10) Patent No.: US 12,448,359 B2
(45) Date of Patent: Oct. 21, 2025

(54) COMPOUNDS WITH IMMUNOMODULATORY ACTIVITY AND THERAPEUTIC USES THEREOF

(71) Applicant: Purdue Research Foundation, West Lafayette, IN (US)

(72) Inventors: Gaurav Chopra, West Lafayette, IN (US); Prageeth Wijewardhane, West Lafayette, IN (US); Krupal P. Jethava, West Lafayette, IN (US); Jonathan Fine, Jersey City, NJ (US)

(73) Assignee: Purdue Research Foundation, West Lafayette, IN (US)

( * ) Notice: Subject to any disclaimer, the term of this patent is extended or adjusted under 35 U.S.C. 154(b) by 522 days.

(21) Appl. No.: 17/908,530

(22) PCT Filed: Mar. 5, 2021

(86) PCT No.: PCT/US2021/020992
§ 371 (c)(1),
(2) Date: Aug. 31, 2022

(87) PCT Pub. No.: WO2021/183370
PCT Pub. Date: Sep. 16, 2021

(65) Prior Publication Data
US 2023/0159475 A1 May 25, 2023

Related U.S. Application Data

(60) Provisional application No. 62/987,914, filed on Mar. 11, 2020.

(51) Int. Cl.
| | |
|---|---|
| *C07D 319/18* | (2006.01) |
| *A61K 31/357* | (2006.01) |
| *A61K 31/36* | (2006.01) |
| *A61P 35/00* | (2006.01) |
| *C07D 211/32* | (2006.01) |
| *C07D 277/24* | (2006.01) |
| *C07D 319/20* | (2006.01) |
| *C07D 413/06* | (2006.01) |
| *C07D 413/14* | (2006.01) |
| *C07D 419/04* | (2006.01) |
| *C07D 419/14* | (2006.01) |
| *C07F 5/02* | (2006.01) |

(52) U.S. Cl.
CPC .......... *C07D 277/24* (2013.01); *C07D 211/32* (2013.01); *C07D 319/20* (2013.01); *C07D 413/06* (2013.01); *C07D 413/14* (2013.01); *C07D 419/04* (2013.01); *C07D 419/14* (2013.01); *C07F 5/027* (2013.01)

(58) Field of Classification Search
CPC .. C07D 319/18; C07D 319/20; A61K 31/357; A61K 31/36; A61P 35/00
See application file for complete search history.

(56) References Cited

U.S. PATENT DOCUMENTS

| | | | |
|---|---|---|---|
| 10,493,078 B2 | 12/2019 | Chu et al. | |
| 2015/0291549 A1* | 10/2015 | Chupak | A61P 37/02 544/58.4 |
| 2016/0194307 A1 | 7/2016 | Chupak et al. | |
| 2019/0016661 A1 | 1/2019 | Inoue et al. | |
| 2019/0016681 A1 | 1/2019 | Dömling | |

FOREIGN PATENT DOCUMENTS

| | | | |
|---|---|---|---|
| CA | 3175848 | 9/2021 | |
| CN | 105705489 | 6/2016 | |
| WO | WO-2015034820 A1 * | 3/2015 | ........... A61K 31/381 |
| WO | 2015160641 | 10/2015 | |
| WO | 2019197903 | 10/2019 | |
| WO | 2021183370 | 9/2021 | |

OTHER PUBLICATIONS

"Chinese Application Serial No. 202180033571.3, Office Action mailed Dec. 7, 2023", w English translation, 9 pgs.
"Japanese Application Serial No. 2022-554529, Voluntary Amendment filed Mar. 1, 2024", 25 pgs.
"European Application Serial No. 21767165.0, Partial Supplementary European Search Report mailed Apr. 30, 2024", 19 pgs.
"International Application Serial No. PCT US2021 020992, International Preliminary Report on Patentability mailed Sep. 22, 2022", 9 pgs.
"Chinese Application Serial No. 202180033571.3, Response filed Jun. 14, 2024 to Office Action mailed Dec. 7, 2023", w English claims, 18 pgs.
International Search Report and Written Opinion, issued by the ISA/US, Commissioner for Patents, for International Application No. PCT/US2021/020992, mailed Jul. 20, 2021.
Abdel-Magid, A. F., Inhibitors of the PD-1/PD-L1 Pathway Can Mobilize the Immune System: An Innovative Potential Therapy for Cancer and Chronic Infections, ACS Medical Chemistry Letters, 2015, 6, pp. 489-490.
Flynn, G. L. et al., Correlation and Prediction of Mass Transport Across Membranes I: Influence of Alkyl Chain Length on Flux-Determining Properties of Barrier and Diffusant, Journal of Pharmaceutical Sciences, Jun. 1972, vol. 61, No. 6, pp. 838-852.

* cited by examiner

*Primary Examiner* — Joseph K McKane
*Assistant Examiner* — Sagar Patel
(74) *Attorney, Agent, or Firm* — Schwegman Lundberg & Woessner, P.A.

(57) ABSTRACT

The present invention generally relates to new compounds for therapeutic uses. In particular, the disclosed series compounds with immunomodulatory activities are useful for treatment of dysfunctions of the immune system and various cancers. Pharmaceutical composition matters and methods for treating a patient with an immune disease and/or a cancer by administering therapeutically effective amounts of such compound alone or together with other therapeutics are within the scope of this disclosure.

7 Claims, 8 Drawing Sheets

Classification of Training Data

BMS Main Scaffolds

Incyte Main Scaffolds

FIG. 2B Tanimoto Similarities of BMS Molecules
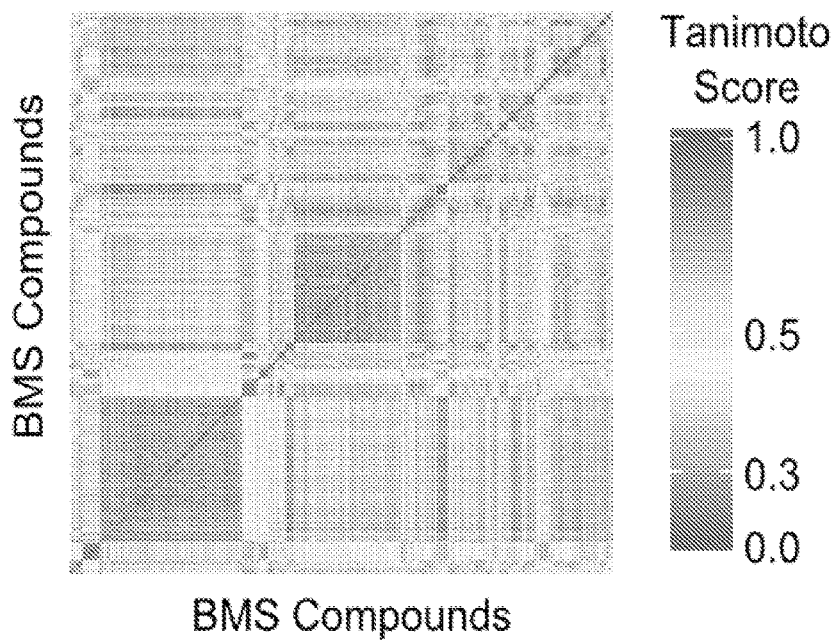
FIG. 2C Tanimoto Similarities of Incyte Molecules
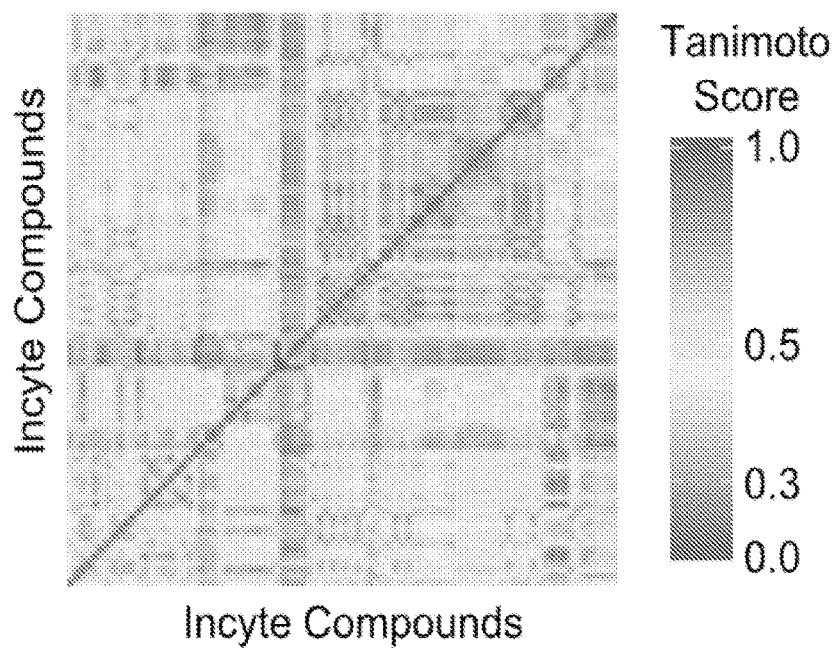

FIG. 3A  Aligned PD-L1 homodimer and PD-1/PD-L1 crystal structures

PD-L1 homodimer binding site overlaps with PD-1/PD-L1 interaction

PD-L1 homodimer with its ligand 8HW

FIG. 4C  Training Set Comparison between EGNN and GNN
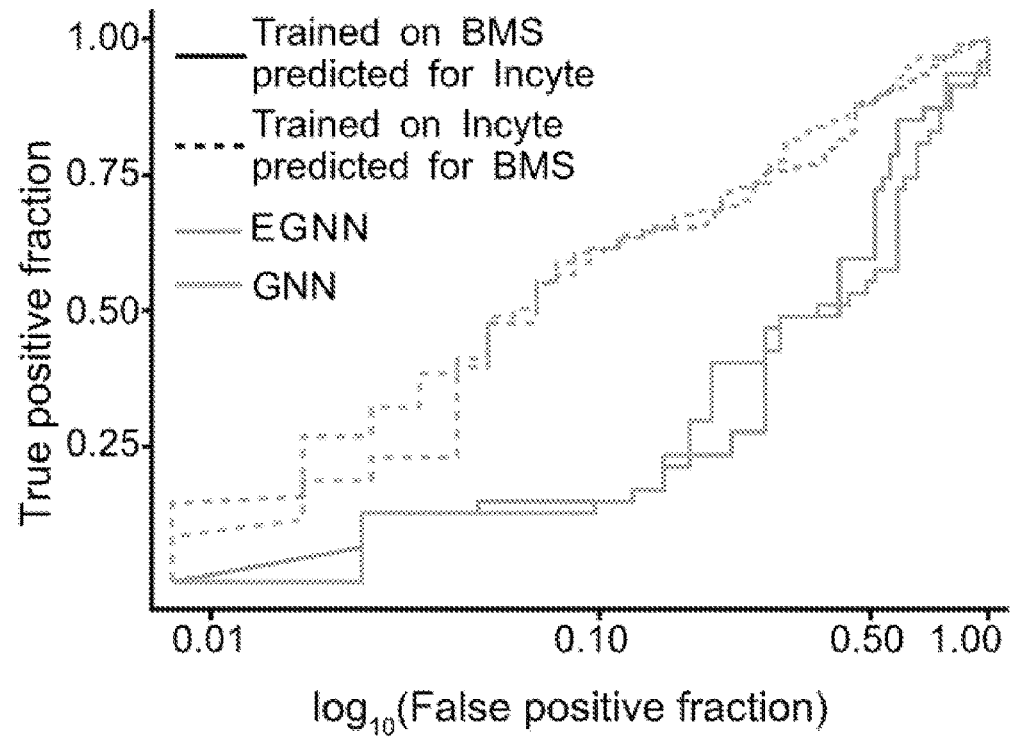
FIG. 4D  ROC Curves for EGNN and Baseline Models
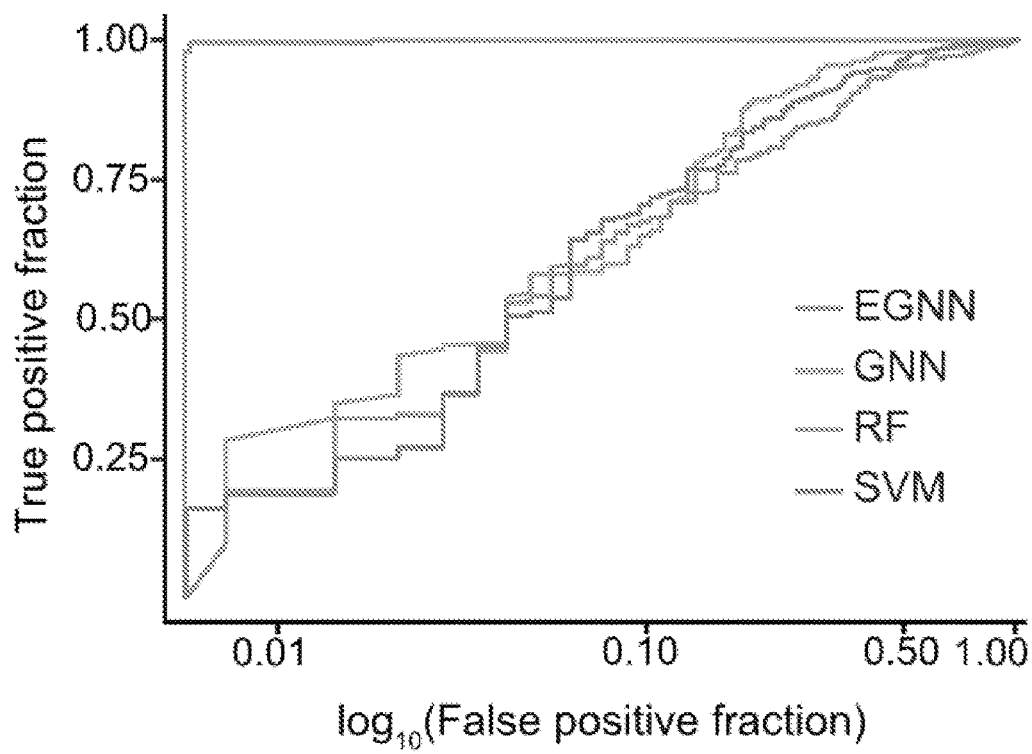

Fig. 5A Rational design of 4b from BMS-1002 and BMS-1
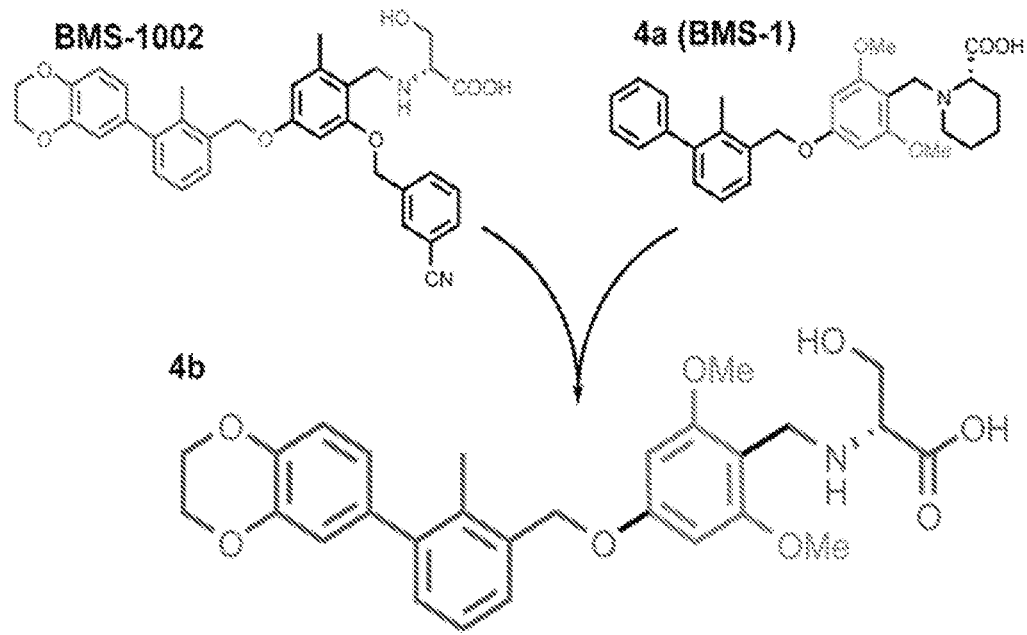
Fig. 5B
Binding tunnel of PD-L1 homodimer with 4b
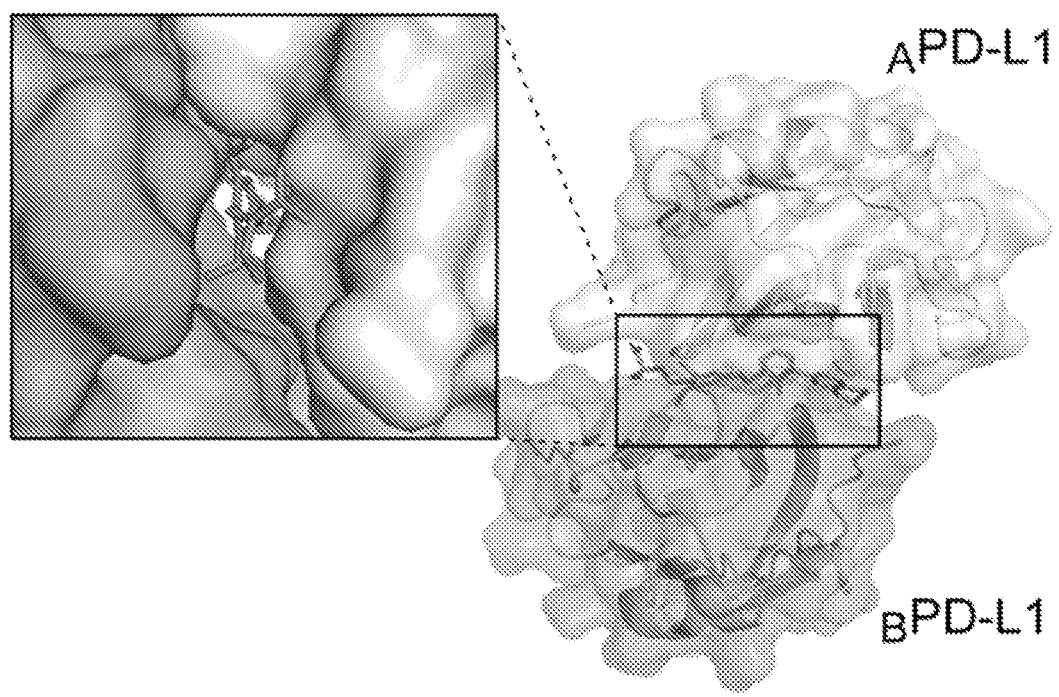

Fig. 5C Docking pose of 4b in the PD-L1 homodimer pocket
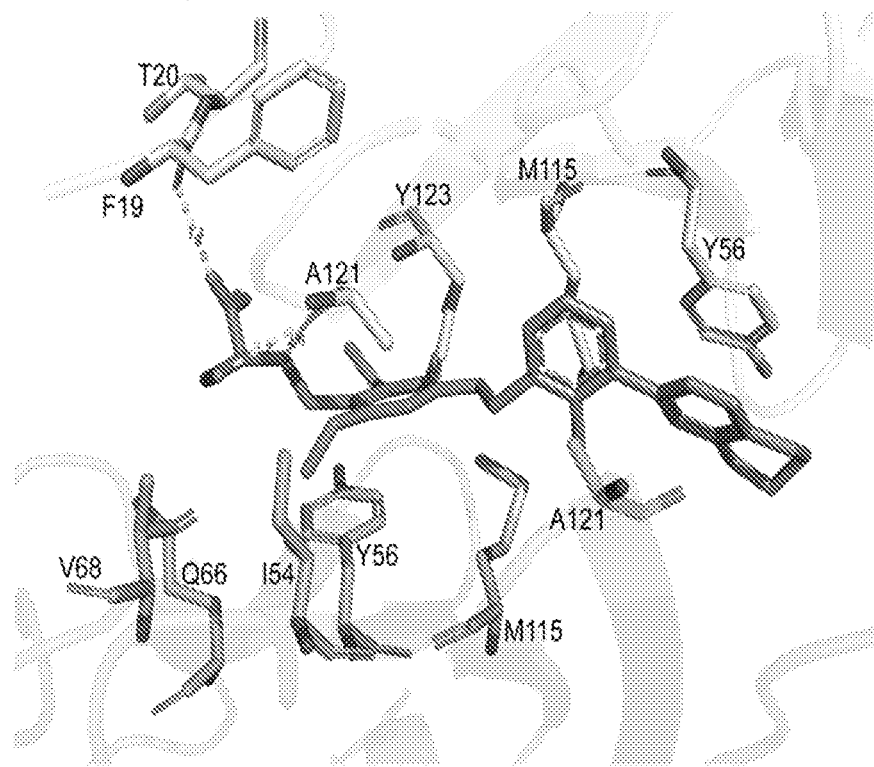
Fig. 5D PD-1/PD-L1 Inhibition for 4a and 4b
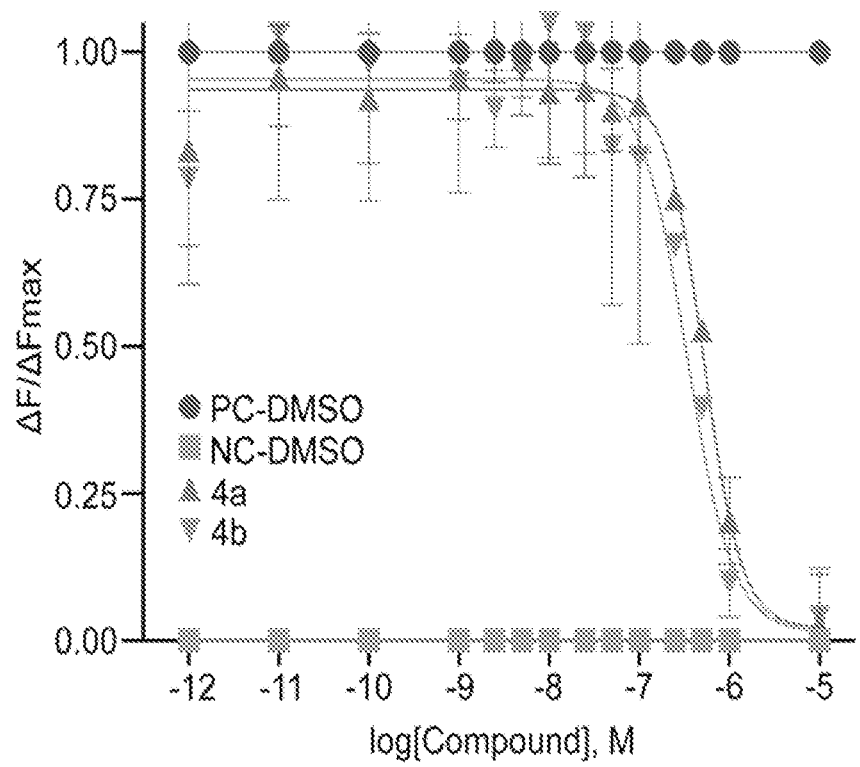

COMPOUNDS WITH IMMUNOMODULATORY ACTIVITY AND THERAPEUTIC USES THEREOF

CROSS REFERENCE TO RELATED APPLICATIONS

The present U.S. patent application is a national stage entry under 35 U.S.C. § 371 (b) of International Application No. PCT/US2021/020992, filed on Mar. 5, 2021, which relates to and claims the priority benefit of U.S. Provisional Application Ser. No. 62/987,914, filed Mar. 11, 2020, the contents of which are hereby incorporated by reference in their entireties.

GOVERNMENT SUPPORT CLAUSE

This invention was made with government support under CA023168 awarded by the National Institutes of Health. The government has certain rights in the invention.

TECHNICAL FIELD

The present invention generally relates to compounds with immunomodulatory activity and their therapeutic uses. Also described herein are pharmaceutical compositions of such compounds and methods for treating a cancer patient by administering therapeutically effective amounts of such compound alone, together with other therapeutics, or in a pharmaceutical composition.

BACKGROUND

This section introduces aspects that may help facilitate a better understanding of the disclosure. Accordingly, these statements are to be read in this light and are not to be understood as admissions about what is or is not prior art.

Programmed cell death protein 1 (PD-1) is an immune checkpoint receptor implicated for the creation of new cancer therapeutics.[1] The prolonged interaction between the T-cell receptor and the major histocompatibility complex (MHC) leads to upregulation of PD-1 on the activated T-cell surface.[2] Activated T cells produce cytokines, such as Interferon-γ, which in turn cause tumor cells to express programmed death ligand 1 (PD-L1) on the their cell surface.[2] Tumors escape the action of immune system by utilizing the interaction between PD-1 and ligand PD-L1 resulting in lower effector T-cell function and survival, as such resulting in a suppressive immune response in the tumor microenvironment.[2] The inhibition of the PD-1/PD-L1 interaction can enhance anti-tumor immunity and a large amount of work has been done to develop monoclonal antibodies as inhibitors of PD-1/PD-L1 interaction inhibitors.[3,4] For example, Pembrolizumab and cemiplimab, and nivolumab are three FDA approved anti-PD-1 antibodies.[4] The discovery of small-molecule inhibitors would be an advantageous over antibodies, such as being fast-acting, simple for in vivo administration, ability to penetrate through cell membranes and interact with the cytoplasmic domains of cell surface receptors.[5] Since a few years, there has been significant development in designing PD-1/PD-L1 inhibitors.[6,7] Specifically, Bristol-Myers Squibb (BMS) discovered a set of potent PD-1/PD-L1 small molecule inhibitors based on the peptidomimetic molecules and non-peptidic small molecules.[6,7] In particular, BMS revealed a 2-methyl-3-biphenyl-methanol scaffold containing chemical libraries. Later, Holak et al. studied the interaction of BMS molecules with PD-L1 suggesting that BMS molecules induce PD-L1 dimerization and also reported crystal structures of compounds with dimeric PD-L1.[8,9] Based on these findings, we envisioned to develop a machine learning (ML) framework for selecting and testing new PD-1/PD-L1 inhibitors. There are unmet medical needs for more effective treatment of cancer, especially PD-1/PD-L1 inhibitors with immunomodulatory activities.

BRIEF DESCRIPTION OF THE DRAWINGS

The above and other objects, features, and advantages of the present invention will become more apparent when taken in conjunction with the following description and drawings, wherein:

FIGS. 2B and 2C show heatmaps of pairwise Tanimoto similarity scores of BMS and Incyte compounds respectively.

FIGS. 3A-3C. The light pink chain represents the PD-1 protein and the pale cyan chain represents the PD-L1 protein in the PD-1/PD-L1 complex crystal structure (PDB ID: 4ZQK). The wheat color chain represents the PD-L1 chain A and the blue white color represents the PD-L1 chain B in the PD-L1 homodimer crystal structure (PDB ID: 5N2F) (FIG. 3A) Overlapped and aligned PD-1/PD-L1 (4ZQK) and PD-L1 dimer (5N2F) crystal structures. (FIG. 3B) Overlapped and aligned two crystal structures with the determined binding site (grey color mesh) of the PD-L1 dimer (5N2F). (FIG. 3C) The PD-L1 dimer (5N2F) crystal structure with the small molecule (ligand ID: 8HW) at its binding site (grey color mesh).

FIG. 4C shows F1 scores for EGNN and GNN models with different training-validation and test sets; and FIG. 4D shows Heatmap of pairwise Tanimoto similarity scores between BMS and Incyte compounds precision-recall curves for EGNN, GNN, RF and SVM models trained with Incyte data.

FIG. 5A shows that EGNN predicted a new PD-1/PD-L1 inhibitor, compound 4b, by scaffold hopping of BMS compounds, 4a or BMS-1 and BMS-1002. Blue colored parts of the 4b are added from the BMS-1002 and pink color part was added from the 4a (BMS-1).

FIG. 5B shows location of top docked pose of the compound 4b in PD-L1 homodimer crystal structure (PDB ID: 5N2F). Inset showing hydrophobic tunnel for compound 4b.

FIG. 5C shows chemical interactions of top docked pose interactions of the compound 4b in PD-L1 homodimer. Blue and pink colored parts are shown as sticks for 4b. The dotted yellow lines between the compound and the residues $_A$Thr20 and $_A$Ala121 represent hydrogen bonding. The orientation of the aromatic ring of tyrosine, $_A$Tyr56, suggests a plausible π-π interaction with 2,3-dihydro-1,4-benzodioxin blue colored aromatic ring in the compound 4b.

FIG. 5D shows comparison of $IC_{50}$ values of 4a (BMS-1 control compound, red color) and new compound 4b (blue color). The DMSO controls for positive (PC-DMSO, purple color) and negative controls (NC-DMSO, green color) of the assay are shown for each tested concentration.

DETAILED DESCRIPTION

Figure 1:
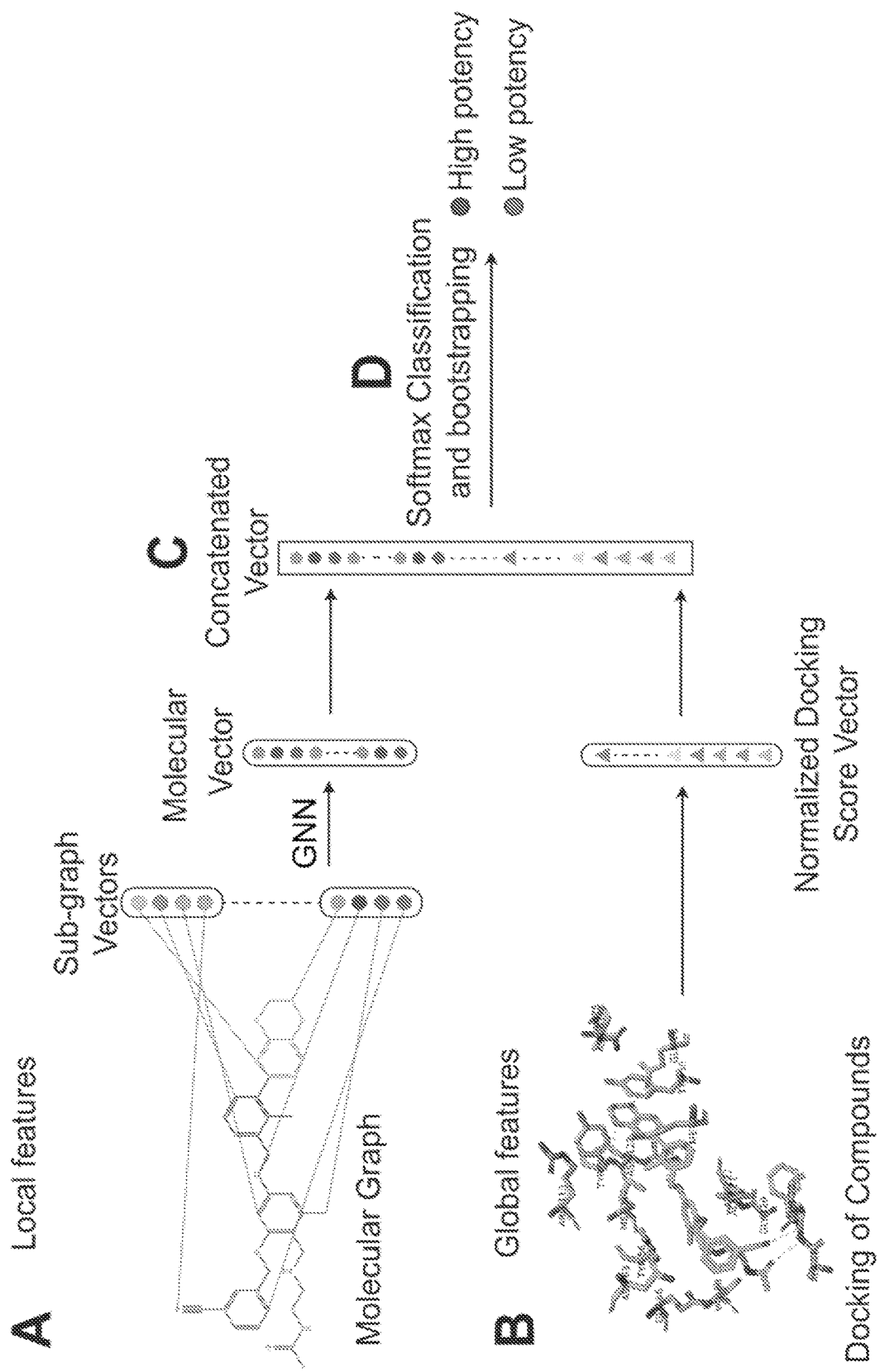
FIG. 1. The EGNN model takes advantage of a combination of local (A) and global (B) features. The local features are calculated from the molecular graph of a molecule using a GNN to assign weights to various sub-graphs of the molecule. The global features are a collection of docking scores used to represent the interactions between the compound and protein. These two features are combined to create a concatenated vector (C) which is passed through a SoftMax layer and bootstrapped to classify a molecule as having 'low' or 'high' potency against PD-1/PD-L1 interaction.

For the purposes of promoting an understanding of the principles of the present disclosure, references will now be made to the embodiments illustrated in the drawings, and specific language will be used to describe the same. It will nevertheless be understood that no limitation of the scope of this disclosure is thereby intended.

As used herein, the following terms and phrases shall have the meanings set forth below. Unless defined otherwise, all technical and scientific terms used herein have the same meaning as commonly understood to one of ordinary skill in the art.

In the present disclosure the term "about" can allow for a degree of variability in a value or range, for example, within 10%, within 5%, or within 1% of a stated value or of a stated limit of a range. In the present disclosure the term "substantially" can allow for a degree of variability in a value or range, for example, within 90%, within 95%, or within 99% of a stated value or of a stated limit of a range.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting. Further, information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

A "halogen" designates F, Cl, Br or I. A "halogen-substitution" or "halo" substitution designates replacement of one or more hydrogen atoms with F, Cl, Br or I.

As used herein, the term "alkyl" refers to a saturated monovalent chain of carbon atoms, which may be optionally branched. It is understood that in embodiments that include alkyl, illustrative variations of those embodiments include lower alkyl, such as $C_1$-$C_6$ alkyl, methyl, ethyl, propyl, 3-methylpentyl, and the like.

As used herein, the term "alkenyl" refers to an unsaturated monovalent chain of carbon atoms including at least one double bond, which may be optionally branched. It is understood that in embodiments that include alkenyl, illustrative variations of those embodiments include lower alkenyl, such as $C_2$-$C_6$, $C_2$-$C_4$ alkenyl, and the like.

As used herein, the term "alkynyl" refers to an unsaturated monovalent chain of carbon atoms including at least one triple bond, which may be optionally branched. It is understood that in embodiments that include alkynyl, illustrative variations of those embodiments include lower alkynyl, such as $C_2$-$C_6$, $C_2$-$C_4$ alkynyl, and the like.

As used herein, the term "cycloalkyl" refers to a monovalent chain of carbon atoms, a portion of which forms a ring. It is understood that in embodiments that include cycloalkyl, illustrative variations of those embodiments include lower cylcoalkyl, such as $C_3$-$C_8$ cycloalkyl, cyclopropyl, cyclohexyl, 3-ethylcyclopentyl, and the like.

As used herein, the term "cycloalkenyl" refers to an unsaturated monovalent chain of carbon atoms, a portion of which forms a ring. It is understood that in emobodiments that include cycloalkenyl, illustrative variations of those embodiments include lower cycloalkenyl, such as $C_3$-$C_8$, $C_3$-$C_6$ cycloalkenyl.

As used herein, the term "alkylene" refers to a saturated bivalent chain of carbon atoms, which may be optionally branched. It is understood that in embodiments that include alkylene, illustrative variations of those embodiments include lower alkylene, such as C2-C4, alkylene, methylene, ethylene, propylene, 3-methylpentylene, and the like.

It is understood that each of alkyl, cycloalkyl, alkenyl, cycloalkenyl, alkylene, and heterocycle may be optionally substituted with independently selected groups such as alkyl, haloalkyl, hydroxyalkyl, aminoalkyl, carboxylic acid and derivatives thereof, including esters, amides, and nitrites, hydroxy, alkoxy, acyloxy, amino, alky and dialkylamino, acylamino, thio, and the like, and combinations thereof.

As used herein, the term "heterocyclic" or "heterocycle" refers to a monovalent chain of carbon and heteroatoms, wherein the heteroatoms are selected from nitrogen, oxygen, and sulfur, and a portion of which, at least one heteroatom, forms a ring. The term "heterocycle" may include both "aromatic heterocycles" and "non-aromatic heterocycles." Heterocycles include 4-7 membered monocyclic and 8-12 membered bicyclic rings, such as imidazolyl, thiazolyl, oxazolyl, oxazinyl, thiazinyl, dithianyl, dioxanyl, isoxazolyl, isothiazolyl, triazolyl, furanyl, tetrahydrofuranyl, dihydrofuranyl, pyranyl, tetrazolyl, pyrazolyl, pyrazinyl, pyridazinyl, imidazolyl, pyridinyl, pyrrolyl, dihydropyrrolyl, pyrrolidinyl, piperidinyl, piperazinyl, pyrimidinyl, morpholinyl, tetrahydrothiophenyl, thiophenyl, azetidinyl, oxetanyl, thiiranyl, oxiranyl, aziridinyl, and the like. "Heterocycles" may be optionally substituted at any one or more positions capable of bearing a hydrogen atom.

As used herein, the term "aryl" includes monocyclic and polycyclic aromatic carbocyclic groups, each of which may be optionally substituted. The term "optionally substituted aryl" refers to an aromatic mono or polycyclic ring of carbon atoms, such as phenyl, naphthyl, and the like, which may be optionally substituted with one or more independently selected substituents, such as halo, hydroxyl, amino, alkyl, or alkoxy, alkylsulfony, cyano, nitro, and the like.

The term "heteroaryl" or "aromatic heterocycle" includes substituted or unsubstituted aromatic single ring structures, preferably 5- to 7-membered rings, more preferably 5- to 6-membered rings, whose ring structures include at least one heteroatom, preferably one to four heteroatoms, more preferably one or two heteroatoms. The term "heteroaryl" may also include ring systems having one or two rings wherein at least one of the rings is heteroaromatic, e.g., the other cyclic rings can be cycloalkyl, cycloalkenyl, cycloalkynyl, aromatic carbocycle, heteroaryl, and/or heterocycle. Heteroaryl groups include, without limitation, pyridyl, N-oxopyridyl, pyrimidinyl, pyrazinyl, pyridazinyl, triazinyl, furyl, quinolyl, isoquinolyl, thienyl, imidazolyl, thiazolyl, indolyl, pyrryl, oxazolyl, benzofuryl, benzothienyl, benzthiazolyl, isoxazolyl, pyrazolyl, triazolyl, tetrazolyl, indazolyl, 1,2,4-thiadiazolyl, isothiazolyl, benzothienyl, purinyl, carbazolyl, benzimidazolyl, indolinyl, and the like. In some embodiments, the heteroaryl group has from 1 to about 20 carbon atoms, and in further embodiments from about 3 to about 20 carbon atoms. In some embodiments, the heteroaryl group contains 3 to about 14, 3 to about 7, or 5 to 6 ring-forming atoms. In some embodiments, the heteroaryl group has 1 to about 4, 1 to about 3, or 1 to 2 heteroatoms.

In some embodiments, "heterocycloalkyl" refers to a non-aromatic heterocycle where one or more of the ring-forming atoms are a heteroatom such as an O, N, or S atom. Heterocycloalkyl groups can include mono- or polycyclic (e.g., having 2, 3 or 4 fused rings) ring systems as well as spirocycles. Example heterocycloalkyl groups include morpholino, thiomorpholino, piperazinyl, tetrahydrofuranyl, tetrahydrothienyl, 2,3-dihydrobenzofuryl, 1,3-benzodioxole, benzo-1,4-dioxane, piperidinyl, pyrrolidinyl, isoxazolidinyl, isothiazolidinyl, pyrazolidinyl, oxazolidinyl, thiazolidinyl, imidazolidinyl, and the like. Also included in the definition of heterocycloalkyl are moieties that have one or more aromatic rings fused (i.e., having a bond in common with) to the nonaromatic heterocyclic ring, for example phthalimidyl, naphthalimidyl, and benzo derivatives of heterocycles. A heterocycloalkyl group having one or more fused aromatic rings can be attached though either the aromatic or non-aromatic portion.

The term "optionally substituted," or "optional substituents," as used herein, means that the groups in question are either unsubstituted or substituted with one or more of the substituents specified. When the groups in question are substituted with more than one substituent, the substituents may be the same or different. Furthermore, when using the terms "independently," "independently are," and "independently selected from" mean that the groups in question may be the same or different. Certain of the herein defined terms may occur more than once in the structure, and upon such occurrence each term shall be defined independently of the other.

The term "patient" includes human and non-human animals such as companion animals (dogs and cats and the like) and livestock animals. Livestock animals are animals raised for food production. The patient to be treated is preferably a mammal, in particular a human being.

The term "pharmaceutically acceptable carrier" is art-recognized and refers to a pharmaceutically-acceptable material, composition or vehicle, such as a liquid or solid filler, diluent, excipient, solvent or encapsulating material, involved in carrying or transporting any subject composition or component thereof. Each carrier must be "acceptable" in the sense of being compatible with the subject composition and its components and not injurious to the patient. Some examples of materials which may serve as pharmaceutically acceptable carriers include: (1) sugars, such as lactose, glucose and sucrose; (2) starches, such as corn starch and potato starch; (3) cellulose, and its derivatives, such as sodium carboxymethyl cellulose, ethyl cellulose and cellulose acetate; (4) powdered tragacanth; (5) malt; (6) gelatin; (7) talc; (8) excipients, such as cocoa butter and suppository waxes; (9) oils, such as peanut oil, cottonseed oil, safflower oil, sesame oil, olive oil, corn oil and soybean oil; (10) glycols, such as propylene glycol; (11) polyols, such as glycerin, sorbitol, mannitol and polyethylene glycol; (12) esters, such as ethyl oleate and ethyl laurate; (13) agar; (14) buffering agents, such as magnesium hydroxide and aluminum hydroxide; (15) alginic acid; (16) pyrogen-free water; (17) isotonic saline; (18) Ringer's solution; (19) ethyl alcohol; (20) phosphate buffer solutions; and (21) other non-toxic compatible substances employed in pharmaceutical formulations.

As used herein, the term "administering" includes all means of introducing the compounds and compositions described herein to the patient, including, but are not limited to, oral (po), intravenous (iv), intramuscular (im), subcutaneous (sc), transdermal, inhalation, buccal, ocular, sublingual, vaginal, rectal, and the like. The compounds and compositions described herein may be administered in unit dosage forms and/or formulations containing conventional nontoxic pharmaceutically acceptable carriers, adjuvants, and vehicles.

Solid medicinal forms can comprise inert components and carrier substances, such as calcium carbonate, calcium phosphate, sodium phosphate, lactose, starch, mannitol, alginates, gelatine, guar gum, magnesium stearate, aluminium stearate, methyl cellulose, talc, highly dispersed silicic acids, silicone oil, higher molecular weight fatty acids, (such as stearic acid), gelatine, agar agar or vegetable or animal fats and oils, or solid high molecular weight polymers (such as polyethylene glycol); preparations which are suitable for oral administration can comprise additional flavorings and/or sweetening agents, if desired.

Liquid medicinal forms can be sterilized and/or, where appropriate, comprise auxiliary substances, such as preservatives, stabilizers, wetting agents, penetrating agents, emulsifiers, spreading agents, solubilizers, salts, sugars or sugar alcohols for regulating the osmotic pressure or for buffering, and/or viscosity regulators. Examples of such additives are tartrate and citrate buffers, ethanol and sequestering agents (such as ethylenediaminetetraacetic acid and its nontoxic salts). High molecular weight polymers, such as liquid polyethylene oxides, microcrystalline celluloses, carboxymethyl celluloses, polyvinylpyrrolidones, dextrans or gelatine, are suitable for regulating the viscosity. Examples of solid carrier substances are starch, lactose, mannitol, methyl cellulose, talc, highly dispersed silicic acids, high molecular weight fatty acids (such as stearic acid), gelatine, agar, calcium phosphate, magnesium stearate, animal and vegetable fats, and solid high molecular weight polymers, such as polyethylene glycol.

Oily suspensions for parenteral or topical applications can be vegetable, synthetic or semisynthetic oils, such as liquid fatty acid esters having in each case from 8 to 22 carbon atoms in the fatty acid chains, for example palmitic acid, lauric acid, tridecanoic acid, margaric acid, stearic acid, arachidic acid, myristic acid, behenic acid, pentadecanoic acid, linoleic acid, elaidic acid, brasidic acid, erucic acid or oleic acid, which are esterified with monohydric to trihydric alcohols having from 1 to 6 carbon atoms, such as methanol, ethanol, propanol, butanol, pentanol or their isomers, glycol or glycerol. Examples of such fatty acid esters are commercially available miglyols, isopropyl myristate, isopropyl palmitate, isopropyl stearate, PEG 6-capric acid, caprylic/capric acid esters of saturated fatty alcohols, polyoxyethylene glycerol trioleates, ethyl oleate, waxy fatty acid esters, such as artificial ducktail gland fat, coconut fatty acid isopropyl ester, oleyl oleate, decyl oleate, ethyl lactate, dibutyl phthalate, diisopropyl adipate, polyol fatty acid esters, inter alia. Silicone oils of differing viscosity, or fatty alcohols, such as isotridecyl alcohol, 2-octyldodecanol, cetylstearyl alcohol or oleyl alcohol, or fatty acids, such as oleic acid, are also suitable. It is furthermore possible to use vegetable oils, such as castor oil, almond oil, olive oil, sesame oil, cotton seed oil, groundnut oil, soybean oil or the like.

Suitable solvents, gelatinizing agents and solubilizers are water or water miscible solvents. Examples of suitable substances are alcohols, such as ethanol or isopropyl alcohol, benzyl alcohol, 2-octyldodecanol, polyethylene glycols, phthalates, adipates, propylene glycol, glycerol, di- or tripropylene glycol, waxes, methyl cellosolve, cellosolve, esters, morpholines, dioxane, dimethyl sulphoxide, dimethylformamide, tetrahydrofuran, cyclohexanone, etc.

Mixtures of gelatinizing agents and film-forming agents are also perfectly possible. In this case, use is made, in particular, of ionic macromolecules such as sodium carboxymethyl cellulose, polyacrylic acid, polymethacrylic acid and their salts, sodium amylopectin semiglycolate, alginic acid or propylene glycol alginate as the sodium salt, gum arabic, xanthan gum, guar gum or carrageenan. The following can be used as additional formulation aids: glycerol, paraffin of differing viscosity, triethanolamine, collagen, allantoin and novantisolic acid. Use of surfactants, emulsifiers or wetting agents, for example of sodium lauryl sulphate, fatty alcohol ether sulphates, di-sodium-N-lauryl-iminodinpropionate, polyethoxylated castor oil or sorbitan monooleate, sorbitan monostearate, polysorbates (e.g. Tween), cetyl alcohol, lecithin, glycerol monostearate, polyoxyethylene stearate, alkylphenol polyglycol ethers, cetyltrimethylammonium chloride or mono-/dialkylpolyglycol ether orthophosphoric acid monoethanolamine salts can also be required for the formulation. Stabilizers, such as montmorillonites or colloidal silicic acids, for stabilizing emulsions or preventing the breakdown of active substances such as antioxidants, for example tocopherols or butylhydroxyanisole, or preservatives, such as p-hydroxybenzoic acid esters, can likewise be used for preparing the desired formulations.

Preparations for parenteral administration can be present in separate dose unit forms, such as ampoules or vials. Use is preferably made of solutions of the active compound, preferably aqueous solution and, in particular, isotonic solutions and also suspensions. These injection forms can be made available as ready-to-use preparations or only be prepared directly before use, by mixing the active compound, for example the lyophilisate, where appropriate containing other solid carrier substances, with the desired solvent or suspending agent.

Intranasal preparations can be present as aqueous or oily solutions or as aqueous or oily suspensions. They can also be present as lyophilisates which are prepared before use using the suitable solvent or suspending agent.

Inhalable preparations can present as powders, solutions or suspensions. Preferably, inhalable preparations are in the form of powders, e.g. as a mixture of the active ingredient with a suitable formulation aid such as lactose.

The preparations are produced, aliquoted and sealed under the customary antimicrobial and aseptic conditions.

As indicated above, a compound of the invention may be administered as a combination therapy with further active agents, e.g. therapeutically active compounds useful in the treatment of cancer, for example, prostate cancer, ovarian cancer, lung cancer, or breast cancer. For a combination therapy, the active ingredients may be formulated as compositions containing several active ingredients in a single dose form and/or as kits containing individual active ingredients in separate dose forms. The active ingredients used in combination therapy may be co-administered or administered separate It is to be understood that the total daily usage of the compounds and compositions described herein may be decided by the attending physician within the scope of sound medical judgment. The specific therapeutically effective dose level for any particular patient will depend upon a variety of factors, including the disorder being treated and the severity of the disorder; activity of the specific compound employed; the specific composition employed; the age, body weight, general health, gender, and diet of the patient: the time of administration, and rate of excretion of the specific compound employed, the duration of the treatment, the drugs used in combination or coincidentally with the specific compound employed; and like factors well known to the researcher, veterinarian, medical doctor or other clinician of ordinary skill.

Depending upon the route of administration, a wide range of permissible dosages are contemplated herein, including doses falling in the range from about 1 µg/kg to about 1 g/kg. The dosage may be single or divided, and may be administered according to a wide variety of dosing protocols, including q.d., b.i.d., t.i.d., or even every other day, once a week, once a month, and the like. In each case the therapeutically effective amount described herein corresponds to the instance of administration, or alternatively to the total daily, weekly, or monthly dose.

As used herein, the term "therapeutically effective amount" refers to that amount of active compound or pharmaceutical agent that elicits the biological or medicinal response in a tissue system, animal or human that is being sought by a researcher, veterinarian, medical doctor or other clinicians, which includes alleviation of the symptoms of the disease or disorder being treated. In one aspect, the therapeutically effective amount is that which may treat or alleviate the disease or symptoms of the disease at a reasonable benefit/risk ratio applicable to any medical treatment.

As used herein, the term "therapeutically effective amount" refers to the amount to be administered to a patient, and may be based on body surface area, patient weight, and/or patient condition. In addition, it is appreciated that there is an interrelationship of dosages determined for humans and those dosages determined for animals, including test animals (illustratively based on milligrams per meter squared of body surface) as described by Freireich, E. J., et al., Cancer Chemother. Rep. 1966, 50 (4), 219, the disclosure of which is incorporated herein by reference. Body surface area may be approximately determined from patient height and weight (see, e.g., Scientific Tables, Geigy Pharmaceuticals, Ardley, New York, pages 537-538 (1970)). A therapeutically effective amount of the compounds described herein may be defined as any amount useful for inhibiting the growth of (or killing) a population of malignant cells or cancer cells, such as may be found in a patient in need of relief from such cancer or malignancy. Typically, such effective amounts range from about 5 mg/kg to about 500 mg/kg, from about 5 mg/kg to about 250 mg/kg, and/or from about 5 mg/kg to about 150 mg/kg of compound per patient body weight. It is appreciated that effective doses may also vary depending on the route of administration, optional excipient usage, and the possibility of co-usage of the compound with other conventional and non-conventional therapeutic treatments, including other anti-tumor agents, radiation therapy, and the like.

The perm "patient" as used herein includes human beings and non-human animals such as companion animals (dogs, cats and the like) and livestock animals. Livestock animals are animals raised for food production. The patient to be treated is preferably a mammal, in particular a human being.

PD-1 programmed cell death-1; PD-L1 programmed death-ligand-1; GNN graph neural network; EGNN energy graph neural network; SVM support vector machines; RF random forest; FDA, U.S. Food and Drug Administration; HTRF, homogeneous time-resolved fluorescence; PPh₃, triphenylphosphine; DIAD, Diisopropyl azodicarboxylate; THF, tetrahydrofuran; Me₄Si Tetramethylsilane; ML, machine learning; AUROC, Area Under the Receiver Operator Characteristic.

The present invention generally relates to new compounds for therapeutic uses. In particular, this disclosure relates to novel compounds with immunomodulatory activities useful for treatment of various cancers.

Also described herein are pharmaceutical compositions of such compounds and methods for treating a cancer patient by administering therapeutically effective amounts of such compound alone, together with other therapeutics, or in a pharmaceutical composition.

In some illustrative embodiments, the present invention relates to a pharmaceutical composition comprising one or more compounds as disclosed herein, or a pharmaceutically acceptable salt thereof, together with one or more diluents, excipients or carriers.

In some illustrative embodiments, the present invention relates to a compound having the formula (I):

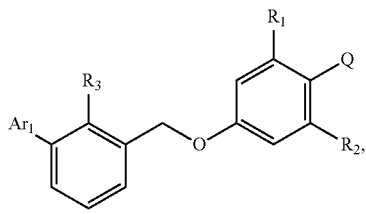

(I)

or a pharmaceutically acceptable salt thereof, wherein

Ar₁ is an optionally substituted aryl or heteroaryl;

R₁ and R₂ are, independently, hydrogen, a halo, azido, nitro, cyano, an alkyl, alkenyl, alkynyl, alkylalkynyl, alkyloxy, hydroxyalkyl, aminoalkyl, thiolalkyl, mercaptoalkyl, heteroalkyl, heteroalkenyl, heteroalkynyl, heterocyclyl, cycloalkyl, cycloalkenyl, cycloheteroalkyl, cycloheteroalkenyl, acyl, aryl, heteroaryl, arylalkyl, arylalkenyl, or arylalkynyl, each of which is optionally substituted;

R₃ is halo, azido, nitro, cyano, an alkyl, alkenyl, alkynyl, alkylalkynyl, alkyloxy, hydroxyalkyl, aminoalkyl, thiolalkyl, mercaptoalkyl, heteroalkyl, heteroalkenyl, heteroalkynyl, heterocyclyl, cycloalkyl, cycloalkenyl, cycloheteroalkyl, cycloheteroalkenyl, acyl, aryl, heteroaryl, arylalkyl, arylalkenyl, or arylalkynyl, each of which is optionally substituted; and Q is:

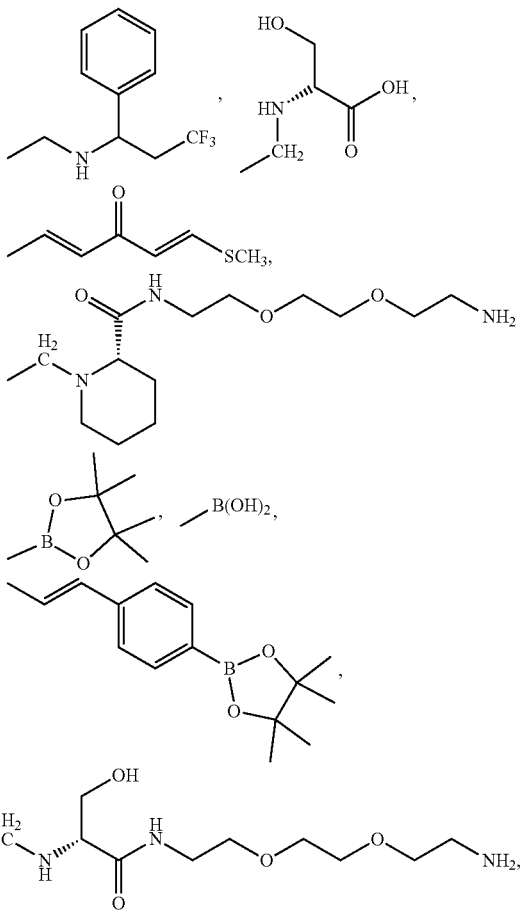

or
one or several amino acid residues.

In some illustrative embodiments, the present invention relates to a compound having the formula (I) as disclosed herein, wherein Ar₁ is phenyl, 2,3-dihydrobenzo[b][1,4]-dioxine, or phenyl(thiazol-2-yl) methanol.

In some illustrative embodiments, the present invention relates to a compound having the formula (I) as disclosed herein, wherein R₁ and R₂ are, independently, hydrogen, methyl, hydroxyl, methoxyl, or —OCH₂Ar.

In some illustrative embodiments, the present invention relates to a compound having the formula (I) as disclosed herein, wherein R₃ is CH₃, CN, or Cl.

In some illustrative embodiments, the present invention relates to a compound having the formula (I) as disclosed herein, wherein the compound comprises

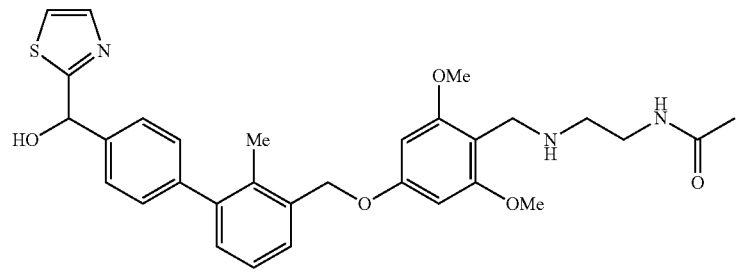

-continued
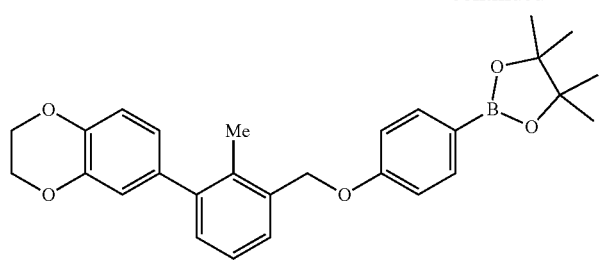
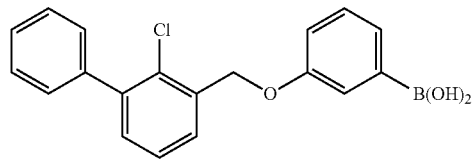
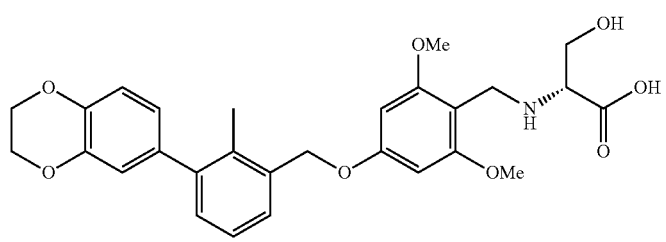
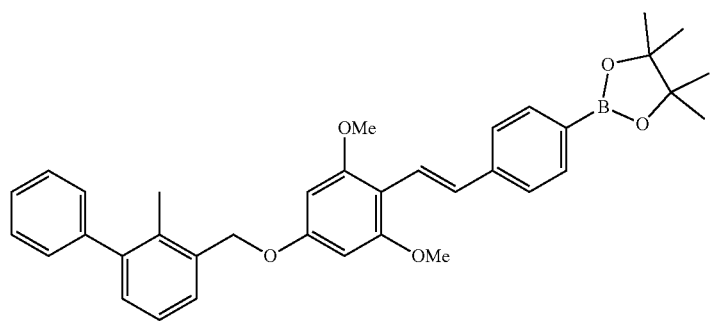
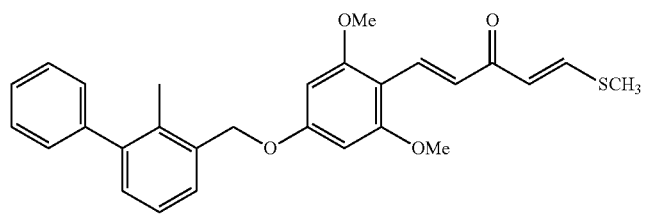
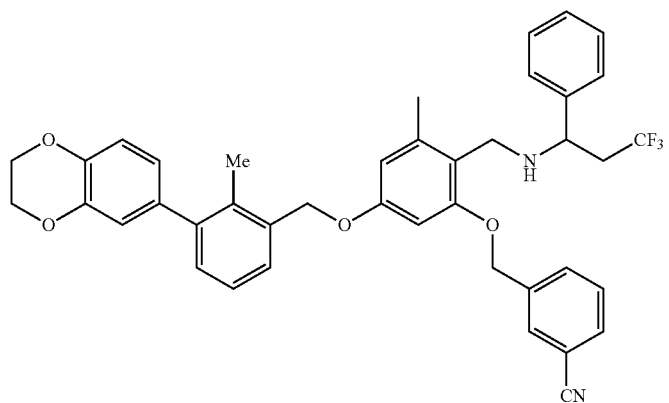

-continued

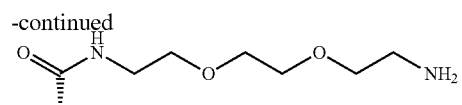
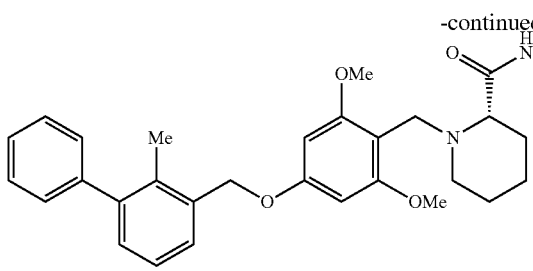

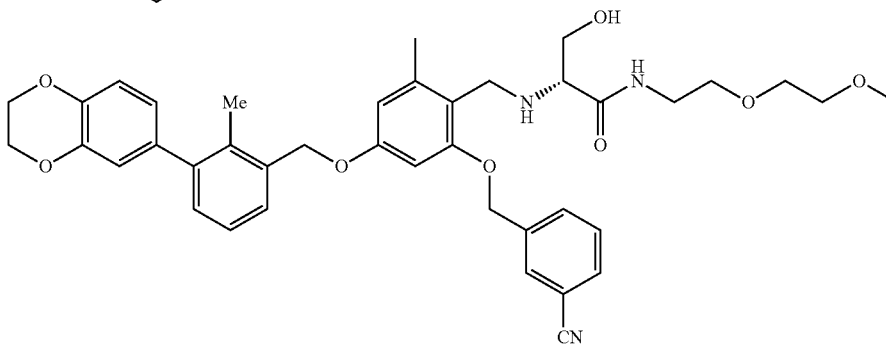

In some other illustrative embodiments, the present invention relates to a compound having a formula (II):

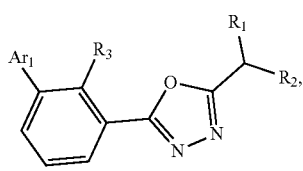

(II)

or a pharmaceutically acceptable salt thereof, wherein $R_1$ is aryl, substituted aryl, heteroaryl;

$R_2$ is a primary or secondary amine containing alkyl, alkenyl, alkynyl, alkylalkynyl, alkyloxy, hydroxyalkyl, amino alkyl, thiolalkyl, mercaptoalkyl, heteroalkyl, heteroalkenyl, heteroalkynyl, heterocyclyl, cycloalkyl, cycloalkenyl, cycloheteroalkyl, cycloheteroalkenyl, acyl, aryl, heteroaryl, arylalkyl, arylalkenyl, or arylalkynyl, each of which is optionally substituted;

$R_3$ is halo, azido, nitro, cyano, an alkyl, alkenyl, alkynyl, alkylalkynyl, alkyloxy, hydroxyalkyl, aminoalkyl, thiolalkyl, mercaptoalkyl, heteroalkyl, heteroalkenyl, heteroalkynyl, heterocyclyl, cycloalkyl, cycloalkenyl, cycloheteroalkyl, cycloheteroalkenyl, acyl, aryl, heteroaryl, arylalkyl, arylalkenyl, or arylalkynyl, each of which is optionally substituted; and $Ar_1$ is an aryl, heteroaryl, arylalkyl, arylalkenyl, or arylalkynyl, each of which is optionally substituted.

In some illustrative embodiments, the present invention relates to a compound having the formula (II) as disclosed herein, wherein $Ar_1$ is phenyl, 2,3-dihydrobenzo[b][1,4]-dioxine, or phenyl(thiazol-2-yl) methanol.

In some illustrative embodiments, the present invention relates to a compound having a formula (II) as disclosed herein, wherein $R_1$ and $R_2$ are, independently, piperidine, pyrrolidine, phenyl, 4-halophenyl (halo=fluoro, bromo, iodo) and/or one or more amino acid residues either as single or in combination of amino acids.

In some illustrative embodiments, the present invention relates to a compound having a formula (II) as disclosed herein, wherein $R_3$ is methyl, CN, or a halo.

In some illustrative embodiments, the present invention relates to a compound having a formula (II) as disclosed herein, wherein the compound is

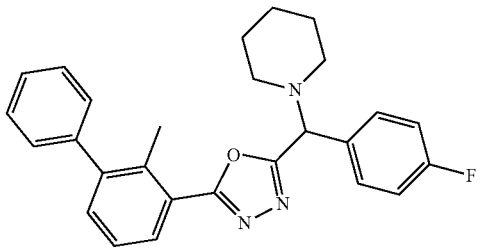

2a

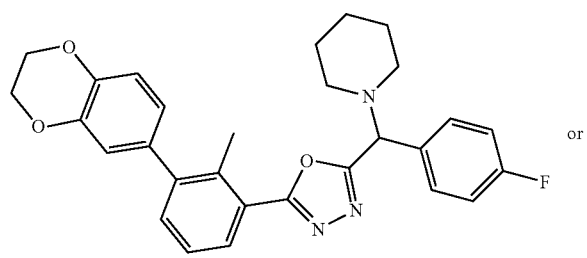

2b or

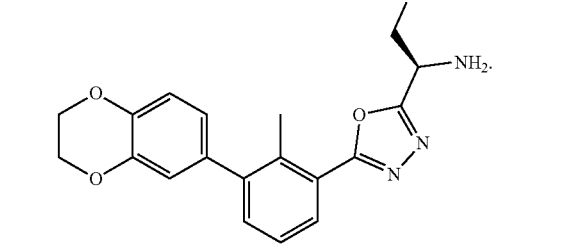

2c

In some illustrative embodiments, the present invention relates to a compound having a formula (III):

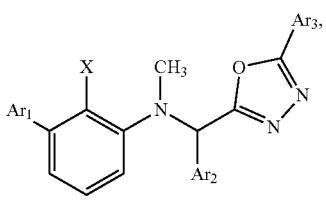

(III)

or a pharmaceutically acceptable salt thereof, wherein $Ar_1$ is phenyl, 2,3-dihydrobenzo [b][ 1,4]dioxine, or phenyl(thiazol-2-yl)methanol;

$Ar_2$ is piperidine or pyrrolidine;

$Ar_3$ is phenyl, 4-halophenyl (halo=fluoro, bromo, iodo); and

X is, independently, a halo, azido, nitro, cyano, an alkyl, alkenyl, alkynyl, alkylalkynyl, alkyloxy, hydroxyalkyl, amino alkyl, thiolalkyl, mercaptoalkyl, heteroalkyl, heteroalkenyl, heteroalkynyl, heterocyclyl, cycloalkyl, cycloalkenyl, cycloheteroalkyl, cycloheteroalkenyl, acyl, aryl, heteroaryl, arylalkyl, arylalkenyl, or arylalkynyl, each of which is optionally substituted.

In some illustrative embodiments, the present invention relates to a compound having a formula (III) as disclosed herein, wherein X is methyl, cyano, or chloro.

In some illustrative embodiments, the present invention relates to a compound having a formula (III) as disclosed herein, wherein the compound is

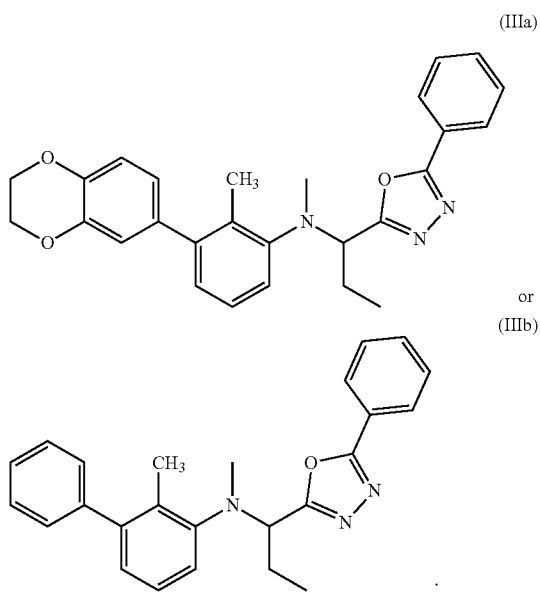

In some illustrative embodiments, the present invention relates to a pharmaceutical composition comprising one or more compounds having the formula (I), (II), (III), or a pharmaceutically acceptable salt thereof, together with one or more diluents, excipients or carriers.

In some illustrative embodiments, the present invention relates to one or more compounds having the formula (I), (II), (III), or a pharmaceutically acceptable salt thereof, together with one or more diluents, excipients or carriers, wherein the compound is an immune modulator.

In some illustrative embodiments, the present invention relates to one or more compounds having the formula (I), (II), (III), or a pharmaceutically acceptable salt thereof, together with one or more diluents, excipients or carriers, wherein the compound is an inhibitor of PD-1 and PDL-1 signaling pathway.

In some illustrative embodiments, the present invention relates to one or more compounds having the formula (I), (II), (III), or a pharmaceutically acceptable salt thereof, together with one or more diluents, excipients or carriers, wherein the compound is for the treatment of a cancer.

In some illustrative embodiments, the present invention relates to a method for treating a patient with a cancer, comprising the step of administering a therapeutically effective amount of one or more compounds having the formula (I), (II), (III), or a pharmaceutically acceptable salt thereof, and one or more carriers, diluents, or excipients, to the patient in need of relief from said cancer.

In some illustrative embodiments, the present invention relates to a method for treating a patient with a cancer, comprising the step of administering a therapeutically effective amount of one or more compounds having the formula (I), (II), (III), or a pharmaceutically acceptable salt thereof, and one or more carriers, diluents, or excipients, to the patient in need of relief from said cancer, wherein the compound is an immune modulator.

In some illustrative embodiments, the present invention relates to a method for treating a patient with a cancer, comprising the step of administering a therapeutically effective amount of one or more compounds having the formula (I), (II), (III), or a pharmaceutically acceptable salt thereof, in combination with one or more other compounds of the same or different mode of action, and one or more carriers, diluents, or excipients, to the patient in need of relief from said cancer, wherein the compound is an immune modulator.

In some illustrative embodiments, the present invention relates to a method for treating a patient with a cancer, comprising the step of administering a therapeutically effective amount of one or more compounds having the formula (I), (II), (III), or a pharmaceutically acceptable salt thereof, and one or more carriers, diluents, or excipients, to the patient in need of relief from said cancer, wherein said cancer is castration resistant prostate cancer.

In some illustrative embodiments, the present invention relates to a method for treating a patient with a cancer, comprising the step of administering a therapeutically effective amount of one or more compounds having the formula (I), (II), (III), or a pharmaceutically acceptable salt thereof, and one or more carriers, diluents, or excipients, to the patient in need of relief from said cancer, wherein the compound is an immune modulator.

In some illustrative embodiments, the present invention relates to a pharmaceutical composition comprising one or more compounds having the formula (I), (II), (III), or a pharmaceutically acceptable salt thereof, together with one or more diluents, excipients or carriers, for use as a medicament for cancer.

In some illustrative embodiments, the present invention relates to a drug conjugate comprising one or more compounds having the formula (I), (II), (III), or a pharmaceutically acceptable salt thereof, and one or more carriers, diluents, or excipients.

In some illustrative embodiments, the present invention relates to a drug conjugate comprising one or more compounds having the formula (I), (II), (III), or a pharmaceutically acceptable salt thereof, and one or more carriers, diluents, or excipients, wherein the conjugate confers cell-type or tissue type targeting or the conjugate targets another pathway that synergizes the action of those compounds.

In some illustrative embodiments, the present invention relates to a method for treating a cancer patient, comprising the step of administering a therapeutically effective amount of one or more compounds, together with one or more carriers, diluents, or excipients, to a patient in need of relief from said cancer, wherein the compound having the formula of (I), (II), or (III).

In some illustrative embodiments, the present invention relates to a compound having a formula (IV):

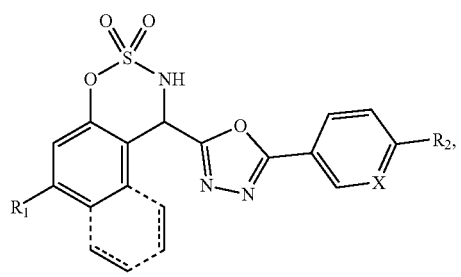

(IV)

or a pharmaceutically acceptable salt thereof, wherein ⎓ represents a single or a double bond;

⌒ represents an optional cyclic ring;

$R_1$ is hydrogen, a halo, azido, nitro, cyano, an alkyl, alkenyl, alkynyl, alkylalkynyl, alkyloxy, hydroxyalkyl, amino alkyl, thiolalkyl, mercaptoalkyl, heteroalkyl, heteroalkenyl, heteroalkynyl, heterocyclyl, cycloalkyl, cycloalkenyl, cycloheteroalkyl, cycloheteroalkenyl, acyl, aryl, heteroaryl, arylalkyl, arylalkenyl, or arylalkynyl, each of which is optionally substituted;

$R^2$ is hydrogen, a halo, azido, nitro, cyano, an alkyl, alkenyl, alkynyl, alkylalkynyl, alkyloxy, hydroxyalkyl, amino alkyl, thiolalkyl, mercaptoalkyl, heteroalkyl, heteroalkenyl, heteroalkynyl, heterocyclyl, cycloalkyl, cycloalkenyl, cycloheteroalkyl, cycloheteroalkenyl, acyl, aryl, heteroaryl, arylalkyl, arylalkenyl, or arylalkynyl, each of which is optionally substituted; and X is a carbon or a nitrogen.

In some illustrative embodiments, the present invention relates to a compound having a formula (IV) as disclosed herein, wherein the compound is 4a

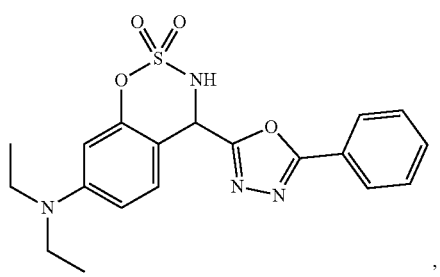

4b

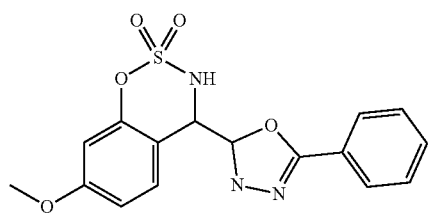

4c

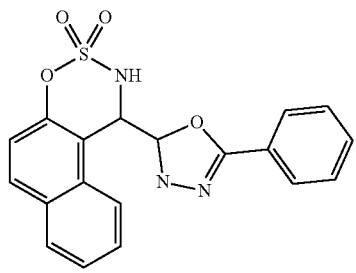

4d

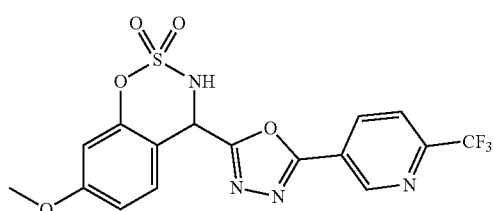

4e

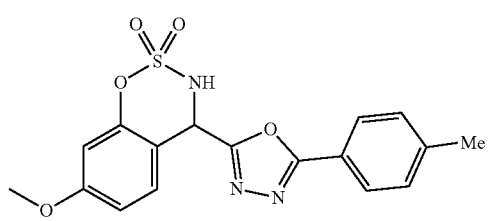

or

4f

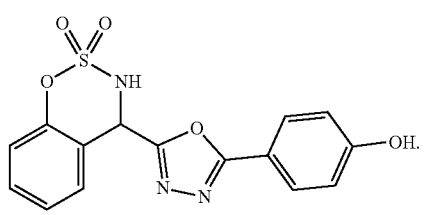

In some illustrative embodiments, the present invention relates to a compound having a formula (V):

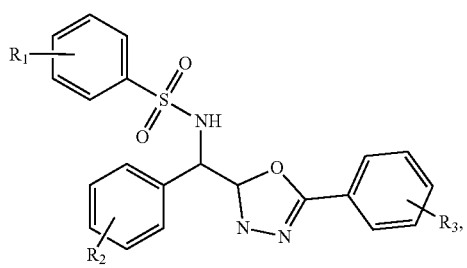

(V)

or a pharmaceutically acceptable salt thereof, wherein $R_1$, $R_2$, and $R_3$, independently, represent five substituents selected from the group consisting of hydrogen, a halo, azido, nitro, cyano, an alkyl, alkenyl, alkynyl, alkylalkynyl, alkyloxy, hydroxyalkyl, amino alkyl, thiolalkyl, mercaptoalkyl, heteroalkyl, heteroalkenyl, heteroalkynyl, heterocyclyl, cycloalkyl, cycloalkenyl, cycloheteroalkyl, cycloheteroalkenyl, acyl, aryl, heteroaryl, arylalkyl, arylalkenyl, or arylalkynyl, each of which is optionally substituted; or any two adjacent substituents joining together form a cyclic or a heterocyclic moiety.

In some illustrative embodiments, the present invention relates to a compound having a formula (V) as disclosed herein, wherein $R_1=CH_3$.

In some illustrative embodiments, the present invention relates to a compound having a formula (V) as disclosed herein, wherein $R_1=Cl$.

In some illustrative embodiments, the present invention relates to a compound having a formula (V) as disclosed herein, wherein the compounds are

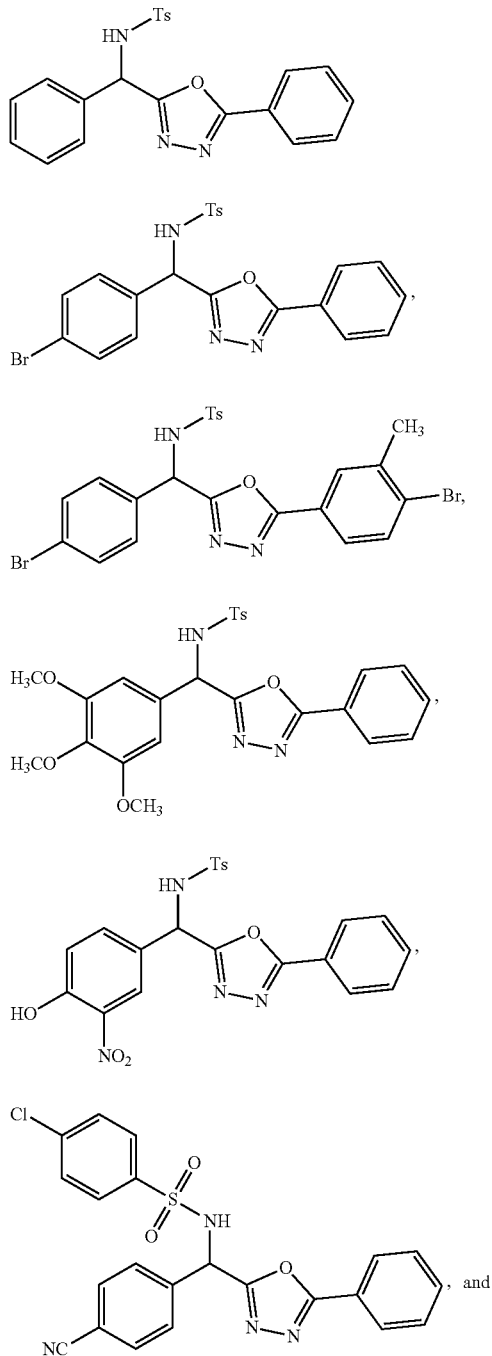

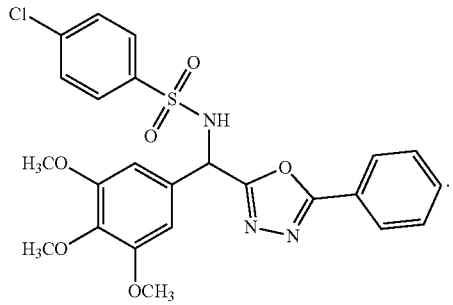

In some illustrative embodiments, the present invention relates to a compound having formula VI or VII:

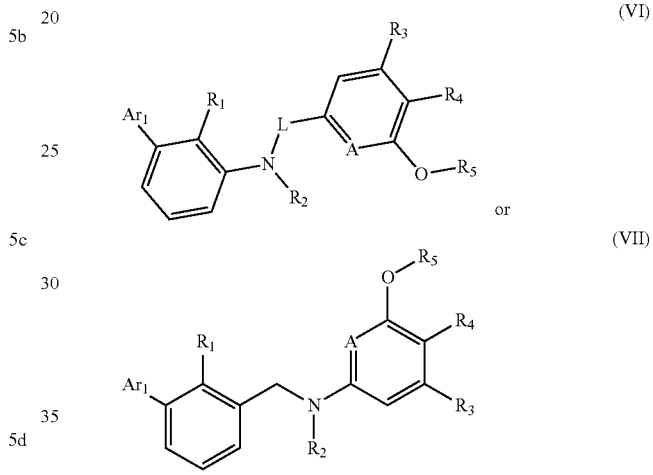

or a pharmaceutically acceptable salt thereof, wherein

A is a carbon or a nitrogen;

L is $(CH_2)_n$, —SO, —SO$_2$, —CO, —CO(CH$_2$)O, where n is 0, 1, 2;

$Ar_1$ is an aryl, heteroaryl, arylalkyl, arylalkenyl, or arylalkynyl, each of which is optionally substituted;

$R_1$ is halo, azido, nitro, cyano, an alkyl, alkenyl, alkynyl, alkylalkynyl, alkyloxy, hydroxyalkyl, aminoalkyl, thiolalkyl, mercaptoalkyl, heteroalkyl, heteroalkenyl, heteroalkynyl, heterocyclyl, cycloalkyl, cycloalkenyl, cycloheteroalkyl, cycloheteroalkenyl, acyl, aryl, heteroaryl, arylalkyl, arylalkenyl, or arylalkynyl, each of which is optionally substituted; and $R_2$ is H, methyl, ethyl or any alkyl;

$R_3$ is a halo, —OR, —NO$_2$, cyano, —NR$^a$R$^b$, —N$_3$, —S(O)$_2$R$^a$, —C(alkyl), —C(cycloalkyl), C(alkynyl), C(haloalkyl), acyl, aryl, heteroaryl, arylalkyl, arylalkenyl, or arylalkynyl, each of which is optionally substituted, wherein R, R$^a$, and R$^b$ are independently an alkyl;

$R_4$ is a halo, an amino acid, a saturated or unsaturated aromatic or heteroaromatic ring, a carbohydrate derivative; or —(CH$_2$)$_m$NR$^a$R$^b$, wherein m=0, 1, 2; wherein R$^a$ and R$^b$ are independently an alkyl;

or $R_3$ and $R_4$ are joining together to form a cyclic or a heterocyclic moiety; and $R_5$ is a halo, —OR, —NO$_2$, cyano, —NR$^a$R$^b$, —N$_3$, —S(O)$_2$R$^a$, —C(alkyl), —C(cycloalkyl), C(alkynyl), C(haloalkyl), acyl, aryl, heteroaryl, arylalkyl, arylalkenyl, or arylalkynyl, each of which is optionally substituted, wherein R, $R^a$, and $R^b$ are independently an alkyl.

In some illustrative embodiments, the present invention relates to a compound having formula VIII:

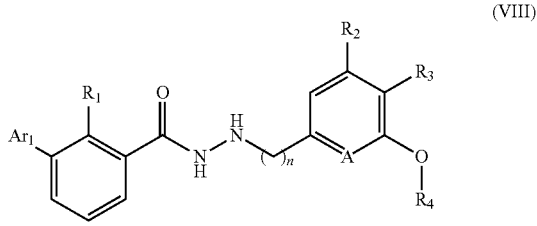

(VIII)

or a pharmaceutically acceptable salt thereof, wherein
n is 0, 1, 2;
A is a carbon or a nitrogen;
$R_1$ is halo, azido, nitro, cyano, an alkyl, alkenyl, alkynyl, alkylalkynyl, alkyloxy, hydroxyalkyl, aminoalkyl, thiolalkyl, mercaptoalkyl, heteroalkyl, heteroalkenyl, heteroalkynyl, heterocyclyl, cycloalkyl, cycloalkenyl, cycloheteroalkyl, cycloheteroalkenyl, acyl, aryl, heteroaryl, arylalkyl, arylalkenyl, or arylalkynyl, each of which is optionally substituted; and
$R_2$ is independently halo, —OR, —NO$_2$, cyano, —NR$^a$R$^b$, —N$_3$, —S(O)$_2$R$^a$, —C(alkyl), C(cycloalkyl), C(alkynyl), C(haloalkyl), acyl, aryl, heteroaryl, arylalkyl, arylalkenyl, or arylalkynyl, each of which is optionally substituted, wherein R, $R^a$, and $R^b$ are independently an alkyl, wherein R, $R^a$, and $R^b$ are independently an alkyl; or $R_2$ and $R_3$ are joining together to form a cyclic or a heterocyclic moiety;
$R_3$ is independently —(CH$_2$)$_m$NR$^a$R$^b$: where m=0 to 2, halo, any amino acid, any saturated or unsaturated aromatic or heteroaromatic rings, or a carbohydrate derivative, wherein $R^a$ and $R^b$ are independently an alkyl;
$R_4$ is independently halo, —OR, —NO2, cyano, —NR$^a$R$^b$, —N$_3$, —S(O)$_2$R$^a$, —C(alkyl), —C(cycloalkyl), C(alkynyl), C(haloalkyl), acyl, aryl, heteroaryl, arylalkyl, arylalkenyl, or arylalkynyl, each of which is optionally substituted, wherein R, $R^a$, and $R^b$ are independently an alkyl, wherein R, $R^a$, and $R^b$ are independently an alkyl; and
$Ar_1$ is an aryl, heteroaryl, arylalkyl, arylalkenyl, or arylalkynyl, each of which is optionally substituted.

In some illustrative embodiments, the present invention relates to a compound having formula IX:

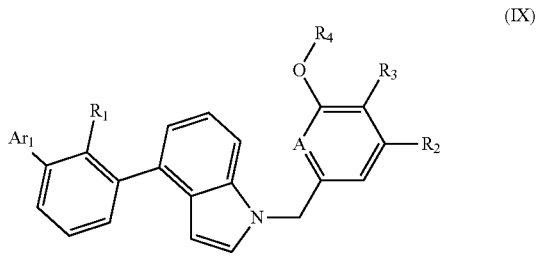

(IX)

or a pharmaceutically acceptable salt thereof, wherein
n is 0, 1, 2;
$R_1$ is halo, azido, nitro, cyano, an alkyl, alkenyl, alkynyl, alkylalkynyl, alkyloxy, hydroxyalkyl, aminoalkyl, thiolalkyl, mercaptoalkyl, heteroalkyl, heteroalkenyl, heteroalkynyl, heterocyclyl, cycloalkyl, cycloalkenyl, cycloheteroalkyl, cycloheteroalkenyl, acyl, aryl, heteroaryl, arylalkyl, arylalkenyl, or arylalkynyl, each of which is optionally substituted; and
$R_2$ is independently halo, —OR, —NO$_2$, cyano, —NR$^a$R$^b$, —N$_3$, —S(O)$_2$R$^a$, —C(alkyl), C(cycloalkyl), C(alkynyl), C(haloalkyl), acyl, aryl, heteroaryl, arylalkyl, arylalkenyl, or arylalkynyl, each of which is optionally substituted, wherein R, $R^a$, and $R^b$ are independently an alkyl;
$R_3$ is independently —(CH$_2$)$_m$NR$^a$R$^b$: where m=0 to 2, halo, any amino acid, any saturated or unsaturated aromatic or heteroaromatic rings, or a carbohydrate derivative, wherein $R^a$ and $R^b$ are independently an alkyl;
$R_4$ is independently halo, —OR, —NO$_2$, cyano, —NR$^a$R$^b$, —N$_3$, —S(O)$_2$R$^a$, —C(alkyl), C(cycloalkyl), C(alkynyl), C(haloalkyl), acyl, aryl, heteroaryl, arylalkyl, arylalkenyl, or arylalkynyl, each of which is optionally substituted, wherein R, $R^a$, and $R^b$ are independently an alkyl;
and
$Ar_1$ is an aryl, heteroaryl, arylalkyl, arylalkenyl, or arylalkynyl, each of which is optionally substituted.

In some illustrative embodiments, the present invention relates to a pharmaceutical composition comprising one or more compounds having the formulae of (IV)~(IX) as disclosed herein, or a pharmaceutically acceptable salt thereof, together with one or more diluents, excipients or carriers.

In some illustrative embodiments, the present invention relates to a pharmaceutical composition comprising one or more compounds having the formulae of (IV)~(IX) as disclosed herein, or a pharmaceutically acceptable salt thereof, together with one or more diluents, excipients or carriers, wherein the compound is an immune modulator.

In some illustrative embodiments, the present invention relates to a pharmaceutical composition comprising one or more compounds having the formulae of (IV)~(IX) as disclosed herein, or a pharmaceutically acceptable salt thereof, together with one or more diluents, excipients or carriers, wherein the compound is an inhibitor of PD-1 and PDL-1 signaling pathway.

In some illustrative embodiments, the present invention relates to a method for treating a cancer patient comprising the step of administering a therapeutically effective amount of one or more compounds having the formulae of (IV)~(IX) as disclosed herein, or a pharmaceutically acceptable salt thereof, together with one or more diluents, excipients or carriers.

In some illustrative embodiments, the present invention relates to a pharmaceutical composition comprising one or more compounds having the formulae of (IV)~(IX) as disclosed herein, or a pharmaceutically acceptable salt thereof, together with one or more diluents, excipients or carriers, wherein the compound is an inhibitor of PD-1 and PDL-1 signaling pathway.

In some illustrative embodiments, the present invention relates to a method for treating a cancer patient comprising the step of administering a therapeutically effective amount of one or more compounds having the formulae of (IV)~(IX) as disclosed herein, and one or more carriers, diluents, or excipients, to the cancer patient in need of relief from said cancer.

In some illustrative embodiments, the present invention relates to a method for treating a cancer patient comprising the step of administering a therapeutically effective amount of one or more compounds having the formulae of (IV)~(IX) as disclosed herein in combination with one or more other compounds of the same or different mode of action, and one or more carriers, diluents, or excipients, to the cancer patient in need of relief from said cancer.

In some illustrative embodiments, the present invention relates to a method for treating a cancer patient comprising the step of administering a therapeutically effective amount of one or more compounds having the formulae of (IV)~(IX) as disclosed herein, and one or more carriers, diluents, or excipients, to the cancer patient in need of relief from said cancer, wherein the compound is an inhibitor of PD-1 and PDL-1 signaling pathway.

In some illustrative embodiments, the present invention relates to a method for treating a cancer patient comprising the step of administering a therapeutically effective amount of one or more compounds having the formulae of (IV)~(IX) as disclosed herein, and one or more carriers, diluents, or excipients, to the cancer patient in need of relief from said cancer, wherein said cancer is castration resistant prostate cancer.

In some illustrative embodiments, the present invention relates to a pharmaceutical composition comprising one or more compounds having the formulae of (I)~(IX) as disclosed herein, and one or more carriers, diluents, or excipients, for use as a medicament for cancer.

The Programmed Cell Death Protein 1/Programmed Death-Ligand 1 (PD-1/PD-L1) interaction is an immune checkpoint utilized by cancer cells to enhance immune suppression. There is a huge need to develop small molecule drugs that are fast acting, cost effective, and readily bioavailable compared to antibodies. Unfortunately, synthesizing and validating large libraries of small-molecules to inhibit PD-1/PD-L1 interaction in a blind manner is both time-consuming and expensive. To improve this drug discovery pipeline, we have developed a machine learning methodology trained on patent data to identify, synthesize, and validate PD-1/PD-L1 small molecule inhibitors. Our model incorporates two features: docking scores to represent the energy of binding (E) as a global feature and sub-graph features through a graph neural network (GNN) of molecular topology to represent local features. This Energy-Graph Neural Network (EGNN) model outperforms traditional machine learning methods as well as a simple GNN with a F1 score of 0.9524 and Cohen's kappa score of 0.8861 for the hold out test set, suggesting that the topology of the small molecule, the structural interaction in the binding pocket, and chemical diversity of the training data are all important considerations for enhancing model performance. A Bootstrapped EGNN model was used to select compounds for synthesis and experimental validation with predicted high and low potency to inhibit PD-1/PD-L1 interaction. The potent inhibitor, (4-((3-(2,3-dihydrobenzo[b][1,4]dioxin-6-yl)-2-methylbenzyl)oxy)-2,6-dimethoxybenzyl)-D-serine, is a hybrid of two known bioactive scaffolds, and has an IC50 values of 339.9 nM that is comparatively better than the known bioactive compound. We conclude that our bootstrapped EGNN model will be useful to identify target-specific high potency molecules designed by scaffold hopping, a well-known medicinal chemistry technique.

Traditionally, the development of small-molecule inhibitors requires high throughput screening of a large library of diverse drug-like compounds[10] or a medicinal chemist iterating over a scaffold with weak receptor activity to enhance potency.[11] This entire process is—(i) time consuming; (ii) needs expensive instrumentation and robotics; (iii) based on trial-and-error; and (iv) highly inefficient to identify several new scaffolds rapidly.[12] In addition, virtual screening using docking methods have been developed to improve this process but with limited success.[13] Further, ML architectures such as Support Vector Machine (SVM)[14-16], Random Forest (RF)[17-19], Graph Convolution Network[20], and Graph Neural Networks (GNN)[21,22] have been used for drug design and predicting drug-target interactions[23,24]. Recently, new architectures utilizing a combination of graph features in the binding site of a protein have shown great promise for calculating binding affinities and determining whether a compound will bind to a target.[20,22]

Several new neural network-based architectures have also been proposed which promise to identify potent scaffolds, but many have not been tested experimentally,[15,16,25-28] and developments in the ability to mine and characterize protein crystallography data hopes to drive the creation of these models.[29] Recently, it has been shown that molecular sub-graph features incorporated through a GNN and protein features encoded by their sequence can be combined to predict if a compound can target a given protein.[24] Inspired by this work and based on our interest in developing methods for drug design and immunology[29-36], we have developed a new machine learning model to predict if a compound can inhibit the PD-1/PD-L1 interaction. Our method replaces the protein sequence features with docking scores representing the free energy of binding and due to this global energetic interaction of the small molecule in the binding pocket, we have termed this model as an "Energy Graph Neural Network" (EGNN). The three-dimensional atomic interaction energetic scores are calculated using CANDOCK[31] (FIG. 1B) and are combined with local molecular graph features (FIG. 1A) using an end-to-end training methodology (FIG. 1C-D). In this work, we use this EGNN model to select designs for synthesis, and experimentally test a curated list of compounds from these predictions to prospectively identify potent PD-L1 small molecule inhibitors using the Homogenous Time-Resolved Fluorescence (HTRF) assay. We also tested negative predictions suggesting the utility of the model to be used for selecting potent leads as PD-1/PD-L1 inhibitors.

Patent Data for Training the EGNN Model

We used PD-1/PD-L1 small molecule inhibition data for 762 compounds from four patents to train our models: WO 2015/034820 A1[7] and WO 2015/160641 A2 by BMS (674 compounds)[6], and WO 2018/119263 A1[37] and US 2018/0273519 A1[38] by Incyte Corporation (88 compounds). A homogeneous time-resolved fluorescence (HTRF) binding assay was used to show activity against PD-1/PD-L1 interaction in the patents. However, the patents did not list individual $IC_{50}$ values for all compounds but provided a range of inhibition with the different molecules. Therefore, we trained a binary classifier with cutoffs for both datasets to treat a molecule as "High potency" or "Low potency" (FIG. 1). If the reported IC50 of a molecule is less than or equal to 100 nM in the patent it was considered as a "High potency" molecule, otherwise it was considered as a "Low potency" molecule. This threshold was selected as it is the only common threshold value among four patents (Table S4). It should be noted that the actual value of IC50 should not be considered here as our experiments with multiple replicates were not able to obtain exactly reported results for some molecules in the patents (see IC50 value of compound 4a in Table 2, BMS-1 annotated with 6-100 nM in the WO 2015/034820 A1 patent7). Therefore, we consider positive prediction (high potency) based on our experimental IC50 value as compared to the upper limit of a BMS control molecule (compound 4a/BMS-1) in WO 2015/034820 A1 patent7. The training dataset of 762 small molecules with the BMS or Incyte annotation is shown in Supporting Information File (TrainingData.xlsx).

Figure 2A:
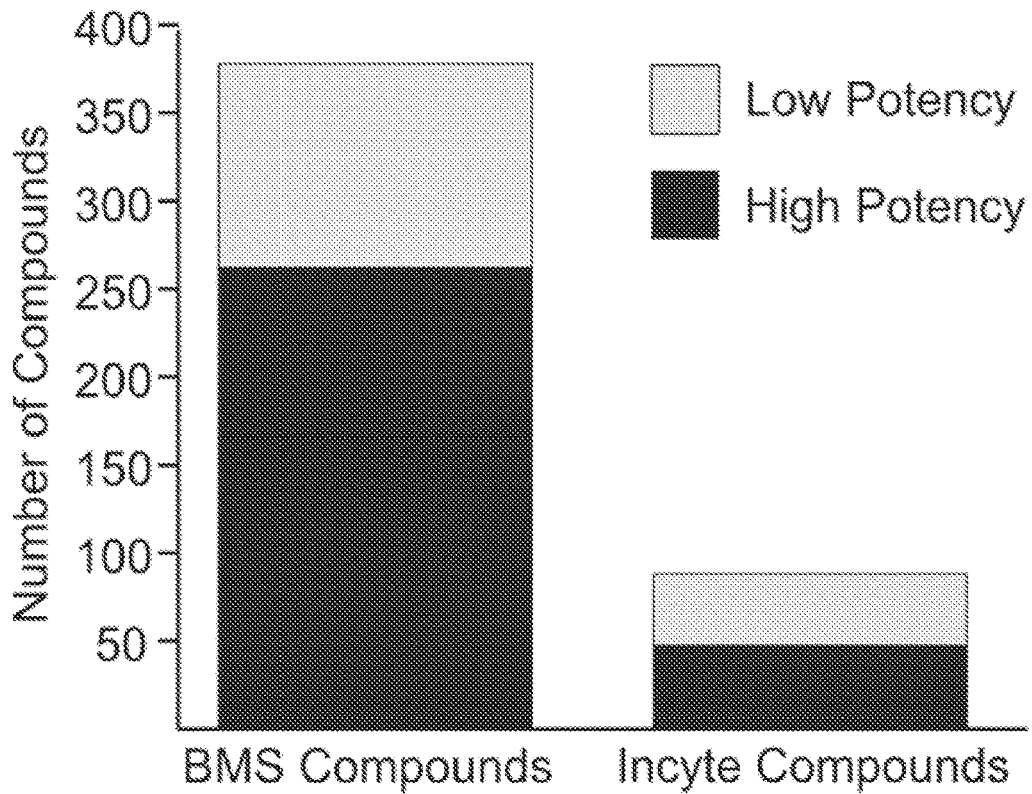
FIG. 2A, Upper: Classification of Training Data in BMS and Incyte Patents; Bottom Left: Main PD-L1 inhibitor scaffolds of BMS patents. R group can be CN, Cl, Br, or $CH_3$; and Bottom Right: Main PD-L1 inhibitor scaffolds of Incyte patents. Here A and B denote sub-scaffolds.
Figure 2A:
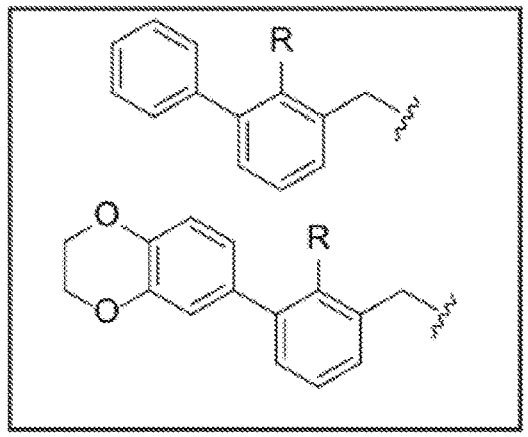
Figure 2A:
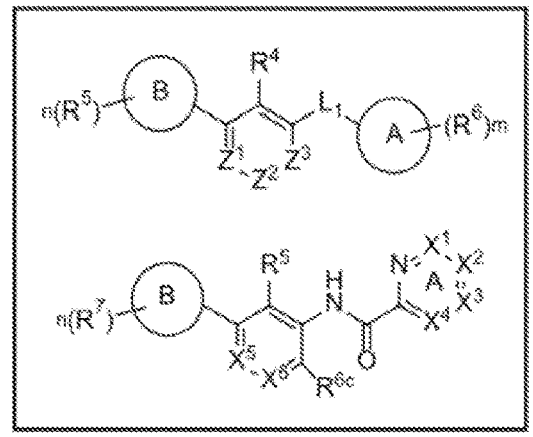

We selected BMS and Incyte patents to include chemical diversity of the molecules in the training data set. FIG. 2A shows the distribution of low and high potency molecules and general scaffolds in the BMS and Incyte patents. The BMS patents have 372 high potency compounds and 302 low potency compounds while the Incyte patents have 47 high potency compounds and 41 low potency compounds respectively. The BMS patent scaffolds contains 417 derivatives of (2-methyl-3-biphenylyl)methanol and 257 derivatives of [3-(2,3-dihydro-1,4-benzodioxin-6-yl)-2-methylphenyl]methanol shown in FIG. 2A (bottom-left) with R groups as CN, Cl, Br, and CH3. On the other hand, Incyte patent scaffolds have distinct sub-scaffolds, denoted as A and B in FIG. 2A (bottom-right). For Incyte scaffolds, X denotes for either N or C—R groups (R: Alkyl groups). These scaffolds suggest that the chemical diversity of Incyte compounds is higher than that of the BMS compounds because the general structures of the compounds in Incyte patents have more structural diversity for sub-scaffolds and atoms. We validated this observation using pairwise Tanimoto similarity scores of BMS and Incyte compounds as shown as heatmaps in FIG. 2B and 2C, respectively. Morgan fingerprints with radius of 2 and bit length of 1024 were used to calculate pairwise Tanimoto similarities. High red color areas in the BMS heatmap indicates that the molecular pairs are structurally similar to each other. Low red areas in the Incyte heatmap suggests it has more chemical diversity in molecular structures. Furthermore, the average pairwise Tanimoto40 similarity score of all BMS compounds was found to be 0.4434 and 0.3920 for all Incyte compounds, confirming higher chemical diversity in Incyte compounds when compared to BMS compounds.

Figure 3B:
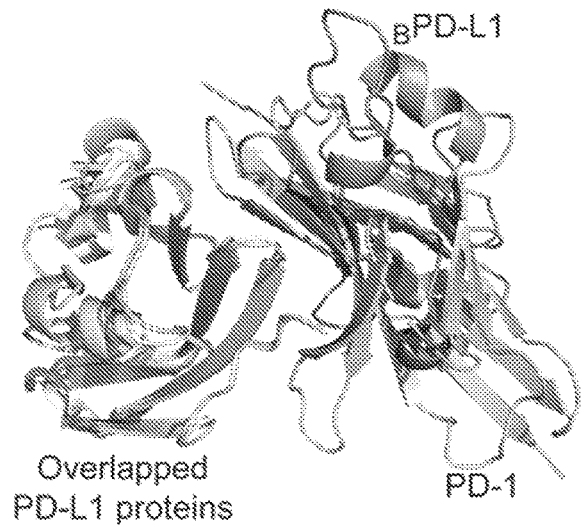

PD-L1 homodimer and PD-1/PD-L1 Crystal Structures Reveals a Binding Site for Docking It has been shown previously that BMS compounds inhibit the PD-1/PD-L1 interaction by inducing dimerization of PD-L1.[8,9] Therefore, a PD-L1 homodimer crystal structure (PDB ID: 5N2F) was selected for docking all the compounds in this manuscript. A PD-1/PD-L1 crystal structure (PDB ID: 4ZQK) was also used to check whether the binding site location of PD-L1 in the homodimer crystal structure (5N2F) overlapped and aligned with each other using the PyMol software package[40] (FIG. 3A). In FIG. 3B, the selected binding site of the PD-L1 homodimer on the overlapped and aligned crystal structures is shown to indicate that the formation of the homodimer of PD-L1 with small molecules blocks the PD-1/PD-L1 interaction. A known inhibitor of the PD-1/PD-L1 interaction (ligand ID: 8HW)[8] in the selected binding site (FIG. 3C) suggests that the selected binding site corresponding to PD-L1 homodimers is relevant to develop PD-1/PD-L1 inhibitors. Therefore, the docking interactions of the PD-L1 homodimer will be relevant towards identifying PD-1/PD-L1 inhibitors. Also, direct docking with the PD-1/PD-L1 was not carried out since the binding site in between the PD-1 and the PD-L1 is filled with interacting amino acid residues from both proteins. Therefore, there is no space to dock a small compound with the PD-1/PD-L1 complex.

CANDOCK[31] was used to generate docking conformations of small molecules with PD-L1 homodimer (see Experimental Section on Generation of Energy Features with Docking and Energy Vector (E) in EGNN for details).

Before developing a machine learning method, we also assessed the ability of only using the docking scores for compounds in the training set for each of the 96 potential energy scoring functions[31] in CANDOCK to classify the high potency vs low potency molecules. Cohen's Kappa scores were used to select the best scoring functions to differentiate between two classes. (Table S1). The scoring function, radial cumulative complete 15 (RCC15) acquired the highest Cohen's kappa score of 0.41447. However, RCC15 scores were not able to clearly separate all the high and low potent classified molecules in the training data (see Violin plots in Figure S1). Using only one scoring function is not sufficient to capture the different states of PD-1/PD-L1 inhibition with small molecules. Therefore, we developed an EGNN model using top scoring function of each class which demonstrated a positive Cohen's kappa value (Table S1) to represent the global features (see Experimental Section on Generation of Energy Features with Docking and Energy Vector (E) in EGNN for details). This included RCR15 (kappa=0.37746) and RCC15 (kappa=0.41447) scoring functions. A model with kappa score between 0.21-0.40 is considered as a fair agreement model and if the kappa score is between 0.41-0.60, then the model is considered as a moderate agreement model.[42]

EGNN Model with Hyperparameter Optimization Outperforms GNN and Other Baseline Models A detailed description of the EGNN model including a combination of molecular GNN combined with docking is given in the Experimental Section. FIG. 1 shows that the EGNN model is a combination of local features of the small molecule represented as a GNN (see Graph Neural Network for Molecular Graphs in EGNN) along with global features of protein-ligand interaction represented as docking scores (see section Generation of Energy Features with Docking and Energy Vector (E) in EGNN). The EGNN was trained with 88 small molecules with high and low potency for PD-1/PD-L1 inhibition extracted from two Incyte patents (see Patent Data for Training the EGNN Model). We calculated variation in the average F1 score (over five cross-validated folds) versus the number of epochs for different hyperparameters (Figure S2). Optimal hyperparameters were selected to avoid overfitting and underfitting for EGNN include: dimension of the hidden molecular vector (dim) =10, sub-graph radius=2, and number of hidden layers=1 (see Experimental Section on EGNN Training and Hyperparameter Optimization).

The EGNN and GNN models were trained with different training sets to examine the effect of chemical diversity on model performance for classification of high and low potency molecules. Two datasets (BMS and Incyte) were used separately and in combination to train the EGNN model and determine the best dataset to predict PD-1/PD-L1 inhibitors. Splitting of the dataset into training-validation set and test set (4:1) were carried out using two different methods: (1) using a random splitter on shuffled data and (2) using a scaffold splitting method by DeepChem library.[43] Then training was carried out with fivefold cross validation and test sets were used to evaluate the models' prediction ability. Here, Cohen's kappa, F1 score and Area Under the Receiver Operator Characteristic Curves (AUROC) were measured to compare three models trained with BMS data only, Incyte data only and BMS-Incyte combined data. Further, as a separate experiment, all the measures were obtained for EGNN and GNN models trained only on BMS data while predicting for Incyte data, and vice versa as well.

Figures 4A, 4B:
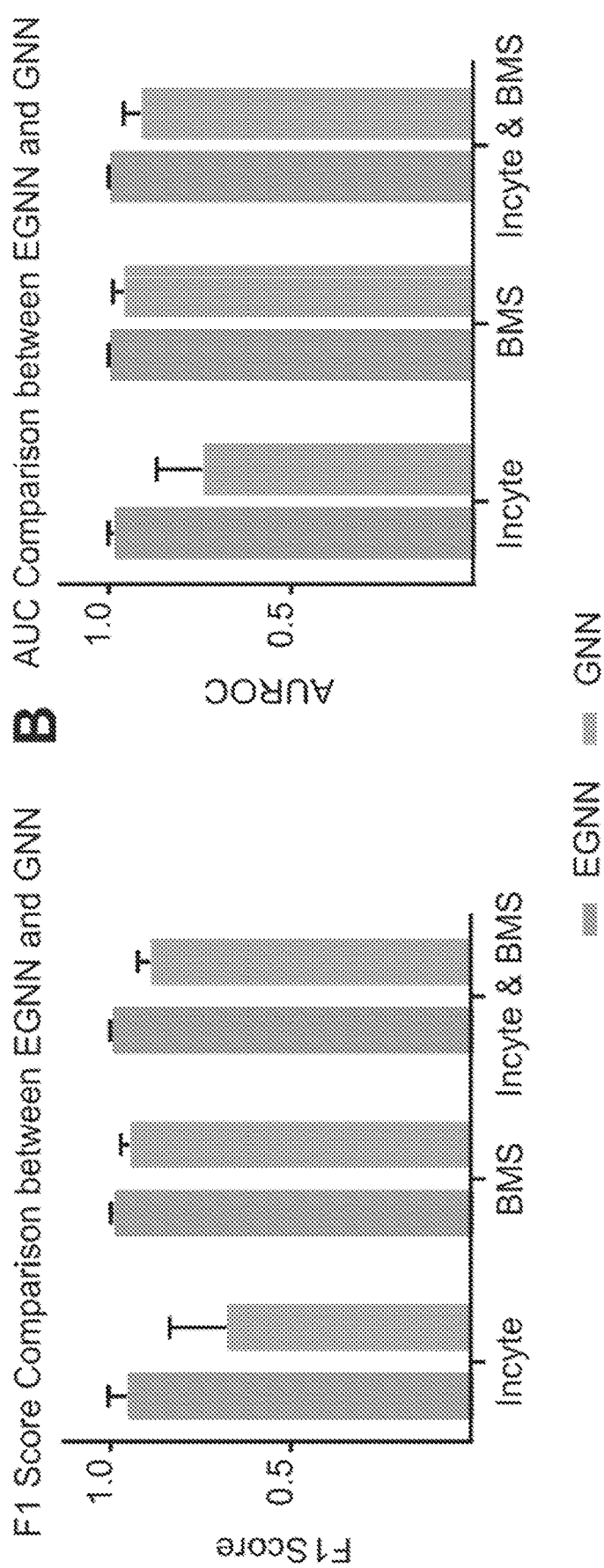
FIG. 4A shows training-validation and Test scheme used for models.
FIG. 4B depicts Cohen's kappa scores for EGNN and GNN with different training-validation and test sets.

FIG. 4A shows how data sets were split within the train-validation-test set scheme. Initial dataset was split into two sets with the 4:1 ratio based on the scaffold splitting or random shuffled splitting. Then the 80% dataset was used as the training and validation dataset while the 20% dataset was used as the hold out test set to evaluate model performances.

FIG. 4A shows average F1 scores (over five-fold cross-validation) for both models trained with BMS compounds, Incyte compounds, and the union of these sets. The average F1 scores of the EGNN and GNN models trained with Incyte data were 0.956 (±0.051) and 0.678 (±0.157), respectively (FIG. 4A). This result suggests that the EGNN trained model with Incyte data that contains diverse chemical scaffolds (FIG. 2C) performs much better than the GNN trained with the same data set. However, when the same test was done with only BMS compounds with lower chemical diversity than Incyte, the average F1 score is comparable for both models with 0.992 (±0.007) for the EGNN model and 0.948 (±0.022) for the GNN model. This suggests that the GNN model performs well with smaller chemical diversity in the training data as compared to larger chemical diversity in training data. However, the EGNN model performs well with both datasets, indicating that it is a superior model to the GNN.

GNN models with scaffold splitting appeared to generate comparable results with the EGNN (Figure S4). However, this was expected since the graph neural network uses the two-dimensional molecular framework/topology in training. When the framework distributions of the compounds are similar in the train-validation and test sets, GNN performs well. However, our intension is to develop a model which could be used to screen a large compound library which would not necessary to share the same distribution of scaffolds with training sets (i.e. Incyte or BMS). Hence, we selected the random splitter with shuffling to create the test set for performance evaluations to develop a more generalized model.

Cohen's kappa scores of different test sets (hold out test set is based on random splitting) for both models trained with BMS compounds, Incyte compounds, and the union of these sets are shown in FIG. 4B. The kappa scores of the EGNN and GNN models trained with Incyte data and tested on the hold out test set were 0.8861 and 0.4304, respectively (FIG. 4B). This result suggests that the EGNN trained model with Incyte data that contains diverse chemical scaffolds (FIG. 2C) performs much better than the GNN trained with the same data set. However, when the same test was done with only BMS compounds with lower chemical diversity than Incyte, the Cohen's kappa score is comparable for both models with 0.6416 for the EGNN model and 0.7164 for the GNN model. This suggests that the GNN model performs well with smaller chemical diversity in the training and test data as compared to larger chemical diversity. Both models show comparable performances with the combined datasets as well. When both BMS and Incyte datasets were combined, the kappa score for the hold out test set of the EGNN model was 0.6072 and 0.6729 for the GNN model. A similar trend is observed for the F1 scores for the three different training set comparisons (FIG. 4C). These results suggest that the EGNN model outperforms the GNN model for chemically diverse data sets such as Incyte data. We believe this to be due to the addition of 'global' energy features captured by the docking scores of PD-L1 homodimers as training data in EGNN compared to only the 'local' structural features of small molecules in the training data for the GNN model.

Figure 3B:
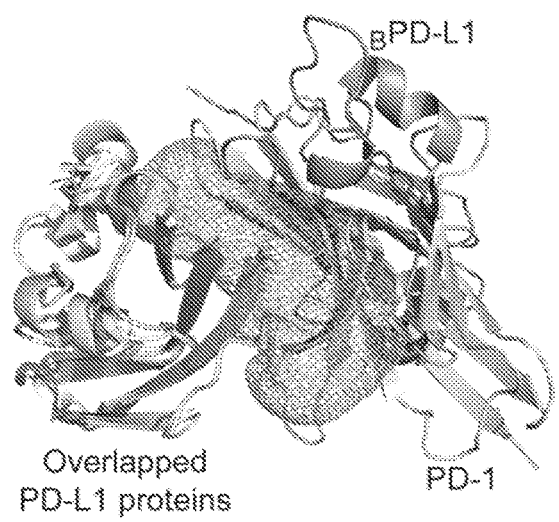
Figure 3C:
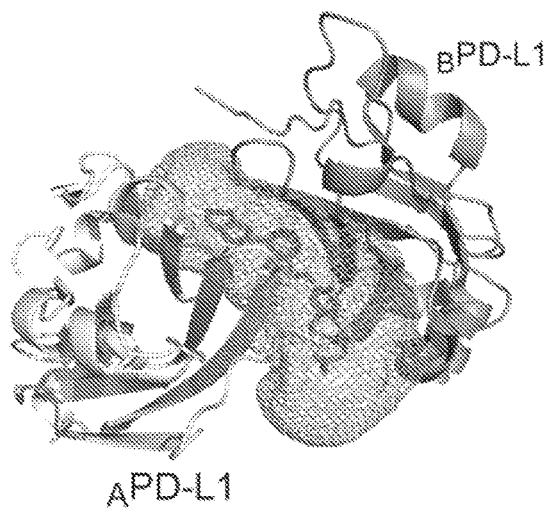

We also investigated the ability of the EGNN and GNN models trained on one compound set to predict high and low potency inhibitors of PD-1/PD-L1 in the other compound set. These results are represented in FIG. 4B and 4C (Kappa scores and F1 scores respectively) with different bar patterns to represent different test sets. Tanimoto similarities between Incyte and BMS compounds are also shown in the FIG. 4D heat map. The average pairwise Tanimoto similarity score of 0.3044 shows that compounds in these two datasets are very dissimilar to each other. When the EGNN and GNN models are trained on BMS compounds and used to predict Incyte compounds, a Cohen's kappa score of 0.1505 for the EGNN and 0.1200 for the GNN was observed and F1 score of 0.3810 and 0.2264 were observed, respectively. On the other hand, both F1 and kappa scores for both models improved when they were trained with Incyte data and used to predict the BMS compounds (kappa score of EGNN=0.3852, GNN=0.3196 and F1 score of EGNN=0.7400, GNN=0.6958). These results show that there is a marked improvement in F1 scores and Cohen's kappa scores for both EGNN and GNN models when trained on Incyte data and tested on BMS. However, AUROC score cannot distinguish these models correctly (FigureS3). This was expected as the AUROC is a not good measure to evaluate models trained on skewed/unbalanced datasets and it can hinder the poor performance of a model.[44] Also, these results suggest that the EGNN model outperforms the GNN model in both cases. (see Table S2 for details). This highlights the importance of chemical diversity in training data even though there is not much compound similarity between the training and test sets. Therefore, it is not suitable to use only BMS or combined BMS and Incyte data to train the final model to make predictions for unknown molecules. Hence, we selected only the Incyte dataset to train the EGNN model which improved the EGNN model performance significantly (Table S2).

Also, we have checked the ability to classify training set compounds into low and high potency classes by just comparing the Tanimoto 2D similarities. Violin plots showing the distributions of Tanimoto 2D similarity scores for low potency, high potency and all compounds are shown in figure S5. This clearly shows that compounds either in the high potency class or the low potency class shows a high probability to have a low pairwise similarity score and that is true even when all the compounds are considered as well. So, it's not enough to just consider the topological similarity to select potent PD-1/PD-L1 inhibitors.

Finally, we compared the cross-validated EGNN model with GNN, Support Vector Machine (SVM), and Random Forest (RF) baseline models trained with Incyte training data, using their test set performances. Both SVM and RF models are trained on local and global features as well. Extracted fingerprints from a molecular graph with the radius of 2 using Weisfeiler-Lehman algorithm[45] were used as 'local' features similar to EGNN and GNN models. Here we have padded zeros up to the maximum fingerprint length to maintain the same fingerprint dimension. Same preselected docking scores (RCR15 and RCC15) obtained by CANDOCK were used as 'global' energy features. Obtained AUROC, AUPRC, Precision, Recall, F1 Score and Cohen's kappa values are tabulated in the Table 1 for all four models. The SVM model was trained using the 'svm' package in scikit-learn library[46] with the "linear" kernel and the RF was trained using the 'RandomForestClassifier' in scikit-learn library[46] with 500 trees. The 'metrics' module in scikit-learn package[46] was used for statistics AUROC, precision, recall, F1 score and Cohen's kappa. Precision-recall curves for models and AUPRC values were obtained using the 'pre-crec' library[47] in R programming language. The EGNN model outperforms all the other models with values of 0.9250, 0.9212, 0.9091, 1.0000, 0.9524, and 0.8861 for AUROC, AUPRC, precision, recall, F1 score, and Cohen's kappa respectively (Table 1). Comparing precision-recall curves of these four models (FIG. 4E) also confirmed that the EGNN model outperforms all three other models. Taken together, the combined local and global features in EGNN gives the best performance with the Incyte dataset.

TABLE 1

AUROC, AUPRC, Precision, Recall, F1 Score and Cohen's kappa of the EGNN for PD-1/PD-L1 inhibitor predictions compared to other baseline models, such as, Random Forest, SVM, and GNN models. All models were trained on the Incyte dataset and evaluated based on the same hold out test set.

| Measure | Model | | | |
|---|---|---|---|---|
| | Random Forest | SVM | GNN | EGNN |
| AUROC | 0.8125 | 0.7750 | 0.8625 | 0.9250 |
| AUPRC | 0.7419 | 0.8266 | 0.8688 | 0.9212 |
| Precision | 0.7692 | 0.8000 | 0.7273 | 0.9091 |
| Recall | 1.0000 | 0.8000 | 0.8000 | 1.0000 |
| F1 Score | 0.8696 | 0.8000 | 0.7619 | 0.9524 |
| Cohen's Kappa | 0.6494 | 0.5500 | 0.4304 | 0.8861 |

Synthetic Selection and Validation of EGNN Predictions for PD-1/PD-L1 Inhibition The EGNN model trained with optimum hyperparameters and the Incyte dataset was used to get predictions for an in-house database of small molecular designs. We developed a bootstrapped EGNN model to predict compounds with high and low potency for PD-1/PD-L1 inhibition using 1000 EGNN models (see section Bootstrapping the EGNN model). Bootstrapping is an essential statistical technique that can be used to select confident molecules for synthesis and experimental validation based on agreements among multiple models. The bootstrapped EGNN model identified high and low potency small molecules as PD-1/PD-L1 inhibitors that were synthesized and then experimentally verified with HTRF binding assay (see Table 2 for summary). Specifically, we selected 4 molecules predicted to be high or low potent for PD-1/PD-L1 inhibition for testing based on bootstrapped EGNN SoftMax average scores and standard deviation (see EGNN SoftMax scores in Table 2).

Out of EGNN bootstrapped predictions, we have selected 1 molecule as highly potent (compound 4b) and 3 low potency molecules with different scaffolds (compound 4c, 4d and 4e) for further testing. We have defined a new parameter called 'counts', which records the number of models out of 100 models which gives a SoftMax score of 0.5 or above for the molecule of interest. Specifically, the compound 4b was predicted to be a high potency PD-1/PD-L1 inhibitor with 99 counts and an average SoftMax score of 0.7771 (±0.1193). In contrast, only 69 counts and average SoftMax svalue of 0.5786 (±0.1406) were resulted for compound 4c, only 5 counts and an average SoftMax value of 0.1821 (±0.1514) were resulted for compound 4d and 62 counts and an average SoftMax value of 0.5280 (±0.1259) were resulted for compound 4e suggesting low potency predictions. We also synthesized a BMS scaffold (compound 4a a known PD-1/PD-L1 inhibitor) for use as a positive control for our HTRF experiments. The compound structures are shown in Scheme 1 and 2 (see Experimental Section for procedures and characterization). The predicted high potency molecule (compound 4b) is (44(3-(2,3-dihydrobenzo[b][1,4]dioxin-6-yl)-2-methylbenzyl)oxy)-2,6-dimethoxybenzyl)-D-serine, a hybrid of two BMS molecules, 4a (BMS-1) and BMS-1002 containing (2-methyl-3-biphenylyl)methanol and [3-(2,3-dihydro-1,4-benzodioxin-6-yl)-2-methylphenyl]methanol, respectively (FIG. 5A) and suggests the ability of EGNN model to do scaffold hopping.

The EGNN trained with Incyte data only had three [3-(2,3-dihydro-1,4-benzodioxin-6-yl)-2-methylphenyl] methanol scaffold containing compounds. As a separate experiment, we have removed these and predicted for our synthesized library and still the EGNN model was able to predict the compound 4b (A compound based on [3-(2,3-dihydro-1,4-benzodioxin-6-yl)-2-methylphenyl]methanol scaffold) as a high potency compound with a SoftMax score of 0.8285±0.1396 and 971 counts. This result demonstrates that the EGNN model can identify high potency PD-1/PD-L1 inhibitors with [3-(2,3-dihydro-1,4-benzodioxin-6-yl)-2-methylphenyl]methanol scaffolds even without being learned on similar scaffolds.

Scheme 1. Representative Synthesis Scheme[a]

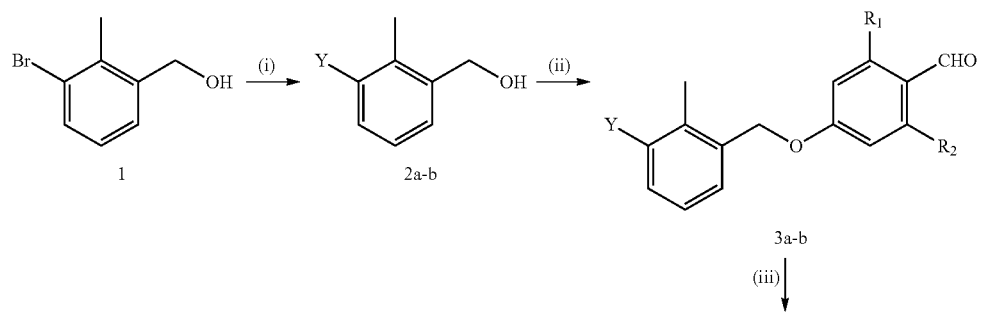

-continued

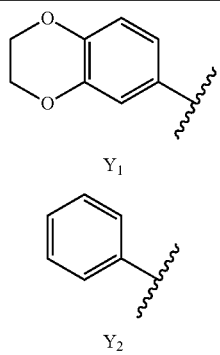

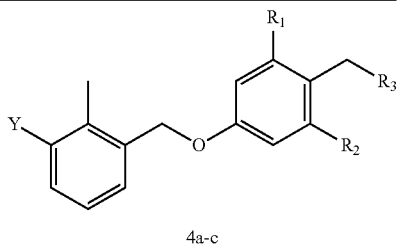

4a-c

| Compound | Y | $R_1$ | $R_2$ | $R_3$ |
|---|---|---|---|---|
| 4a (KPGC01S94) | $Y_2$ | OMe | OMe | piperidine-2-COOH |
| 4b (KPGC01S32) | $Y_1$ | OMe | OMe | serine (NH-CH(CH2OH)-COOH) |
| 4c (KPGC01S138) | $Y_2$ | OMe | OMe | NH-CH(Ph)-CH2CF3 |
| 4e (KPGC01S42) | $Y_2$ | OMe | OMe | piperidine-3-COOH |

[a]Reaction conditions: (i) BH3·THF complex (1.0M in THF), Anhydrous THF, 0° C. to rt, 2 days; (ii) PPh3, DIAD, 0° C. to rt, 20 h, anhydrous THF; (iii) amine component, NaBH3CN, cat. AcOH, DMF, 80° C. or room temperature, 1 h or 3 h or overnight.

Scheme 2. Synthesis of 4d (GCL2)

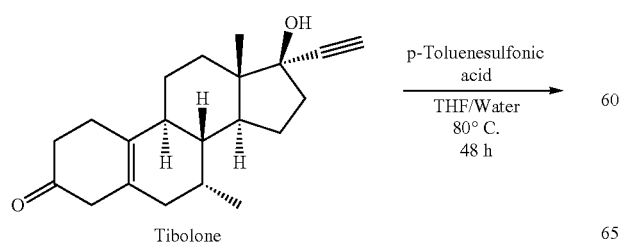

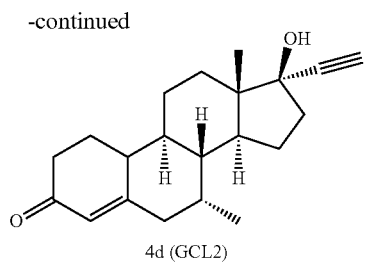

4d (GCL2)

The top docked pose in PD-L1 homodimer (PDB ID: 5N2F) for compound 4b interacts in a similar manner as shown previously for the co-crystal structures[8] (FIG. 5B). Specifically, for compound 4b, the 2,3-Dihydro-1,4-benzodioxine group facilitated the movement of the amino acid residue Tyr56 in chain A of the PD-L1 homodimer ($_A$Tyr56). It is known that this $_A$Tyr56 does not close the hydrophobic pocket from one end if this 2,3-Dihydro-1,4-benzodioxine group is present[8] creating a hydrophobic tunnel (FIG. 5B inset) rather than a hydrophobic cleft in the docked conformation. Additionally, the aromatic ring of compound 4b (2,3-Dihydro-1,4-benzodioxine) was stabilized by π-π stacking interactions with the amino acid residue $_A$Tyr56 (FIG. 5C). The central methylbenzyl ring (magenta color in 4b in FIG. 5A) in the structure is rotated by approximately 30° to 2,3-Dihydro-1,4-benzodioxine ring and the methyl group of the methylbenzyl ring point towards chain B of the PD-L1 homodimer. This orientation results in hydrophobic interactions with Met115 of both chain A and B of the homodimer and with $_B$Ala121. The D-serine end of the 4b compound forms hydrogen bonds with $_A$Thr20 and $_A$Ala121 along with a plausible hydrogen bond formation between backbone NH of $_A$Tyr123 and the oxygen in one of the two methoxy groups of the 4b molecule (FIG. 5C). These results suggest favorable interactions of compound 4b that could dimerize PD-L1 will result in PD-1/PD-L1 inhibition.

The HTRF assay confirmed that compound 4b has an $IC_{50}$ of 339.9 nM (see Experimental Section for details) to inhibit PD-1/PD-L1 interaction (FIG. 5D). This is comparatively better than the $IC_{50}$ of 521.5 nM for the BMS compound 4a that was synthesized and tested in our lab (BMS-1 molecule in the BMS patent WO 2015/034820 A1). It should be noted that the BMS-1 molecule was denoted with the $IC_{50}$ of 6-100 nM with HTRF assay in the BMS patent'. However, multiple replicates of our experiments did not result in the $IC_{50}$ value less than 100 nM to inhibit PD-1/PD-L1 interaction (see Calculation of $IC_{50}$ values section and Supporting File HTRF_$IC_{50}$_Data.xlsx). As mentioned previously, this result does not affect our machine learning method since we have classified molecules based on high and low potency rather than estimating the specific $IC_{50}$ value. A possible explanation of this difference in experimental results between our work and the patent could be differences in protocols used to perform the HTRF assay and calculation of $IC_{50}$ values. For this reason, we have included a detailed account of HTRF assay protocol, analysis of data for calculation of $IC_{50}$ and supporting data files to be used by the scientific community (see Experimental Section). In order to test the validity of our bootstrapped EGNN model to correctly identify low potency predictions, we also tested compounds 4c, 4d and 4e resulting in no/poor inhibition to PD-1/PD-L1 interaction (Table 2). The $IC_{50}$ plots for each compound tested (Figure S6) as well as the $^{13}C$ and $^1H$ NMR spectra are provided as Supporting Information. Pairwise Tanimoto similarity scores between these 4a-4e (Table S3) show that the EGNN model's capability of identifying high potency and low potency inhibitors regardless of the structural similarity. The compound 4e shows a high similarity with the control BMS compound (4e) with a Tanimoto similarity score of 0.8018. However, the model recognized it as a low potency molecule and the actual test showed that it is a poor inhibitor for PD1/PD-L1 with an IC50 of 1261 nM. On the other hand, the model recognized compound 4b as a high potency PD1/PD-L1 inhibitor and the HTRF assay confirmed it with a very good $IC_{50}$ of 339.9 nM. However, it's pairwise Tanimoto similarity score with the control compound (4a) is only 0.5074. Taken together, these results suggest that the bootstrapped EGNN model can be used to select molecules for synthesis and experimental validation of PD-1/PD-L1 inhibition and it can identify low potency molecules which are structurally similar to the control compound 4a.

TABLE 2

$IC_{50}$ values for predicted active and inactive compounds with EGNN SoftMax scores

| Compound | $IC_{50}$ value | SoftMax score | Prediction |
| --- | --- | --- | --- |
| 4a (KPGC01S94) | 521.5 nM | Control* | Control* |
| 4b (KPGC01S32) | 339.9 nM | 0.7771 +/− 0.1193 | High potency |
| 4c (KPGC01S138) | no inhibition | 0.5786 +/− 0.1406 | Low potency |
| 4d (GCL.2) | no inhibition | 0.1821 +/− 0.1514 | Low potency |
| 4e (KPGC01S42) | 1261 nM (poor inhibition) | 0.5280 +/− 0.1259 | Low potency |

*denotes BMS active compound

DISCUSSION AND CONCLUSION

Cancer immunotherapy marks a major step in treating cancer and the development of PD-1/PD-L1 immune checkpoint inhibitors have been an important area of research for treatment of several tumors. Currently, six therapeutic antibodies targeting both PD-1 (pembrolizumab, nivolumab, and cemiplimab) and PD-L1 (atezolizumab, durvalumab, and avelumab) have been approved by U.S. FDA. Recently, several new small molecules PD-1/PD-L1 inhibitors have been developed[43] along with structure determination of human PD-1/PD-L1 complex and cocrystals of inhibitory ligands[44-46]. Still the field is very active in search for new small molecules to inhibit this important checkpoint and we hope to enhance the speed of this search with the use of new structure-based ML methods that have been benchmarked extensively and tested prospectively.

We have developed a new ML methodology, EGNN, based on combining local features of the small molecule topology and global features of the small molecule interacting within the binding pocket as energetic scores to select, synthesize and experimentally validate potent inhibitors of PD-1/PD-L1 interaction. Specifically, EGNN outperforms traditional ML architectures, such as, RF, SVM that include both local and global features, as well as the GNN model that uses only local features of small molecular topology. When benchmarked with known PD-1/PD-L1 inhibitors from BMS and Incyte patents data, we concluded that topology of the small molecule, the structural interaction in the binding pocket, and chemical diversity of the training data are all important considerations for enhancing model performance.

We used a bootstrapped EGNN model (based on 1000 EGNN models) for prediction and confident selection of new molecules for chemical synthesis and subsequent testing of inhibition using HTRF PD-1/PD-L1 inhibition assay. We believe that bootstrapping is an important statistical technique to use with ML methods to confidently select molecules for experimental validation in drug design. The predicted high potency molecule, (4-((3-(2,3-dihydrobenzo [b][1,4]dioxin-6-yl)-2-methylbenzyl)oxy)-2,6-dimethoxybenzyl)-D-serine, is a hybrid of two BMS high potency molecular scaffolds, and has an $IC_{50}$ value of 339.9 nM for inhibiting PD-1/PD-L1 interaction, suggesting the ability of EGNN model to do scaffold hopping to identify new inhibitors. Accurate selection of low potency molecules with different scaffolds suggests practical utility of our bootstrapped model for selection of compounds for synthesis, a hard problem in the field of ML based drug design.

Our EGNN methodology can be further developed with the addition of more chemically diverse data, and incorporating reinforcement iterative learning with experiments performed in each step for developing a library of structurally diverse small molecule inhibiting PD-1/PD-L1 interaction to guide structure-activity relationships. Given the general nature of the machine learning model and docking methodology that is readily available for use, this approach can be adapted to identify small molecule immunomodulators by targeting other immune checkpoints, as well as, generally used to include local and global features for target-based drug design.

EXPERIMENTAL SECTION

Homogenous Time-Resolved Fluorescence (HTRF) Assay to Test Inhibition of Predicted Compounds Inhibition of PD-1/PD-L1 interaction was tested for 4 high and low potent predicted compounds using the PD1/PD-L1 HTRF assay kit from Cisbio US, Inc. The assay protocol was used as mentioned in the kit for each predicted compound (4b, 4c, 4d and 4e) and the BMS control compound (4a). Briefly, 2 µL of the compound, 4 µL from a 25 nM Tag1-PD-L1 protein solution and 4 µL from a 250 nM Tag2-PD1 protein were added into a Cisbio's HTRF 96-well low volume white plate. Then, the plate was incubated for 15 minutes at room temperature. Next, 10 µL from pre-mixed anti-tag detection reagents (5 µL from 1X anti-Tag1-Eu$^{3+}$ and 5 µL from 1X anti-Tag2-XL665) were added and the sealed plate was incubated for 2 hours at room temperature. Finally, the plate sealer was removed, and measurements were taken using a HTRF® compatible reader. This protocol used 12 different concentrations of each compound where the maximum and minimum assay concentrations are 10,000 nM and 0.001 nM respectively. Several replicates at different concentration were done for high potent prediction compound 4b (36 data points) and positive control compound 4a (48 data points). The fitted curve for normalized signal denoted by ΔF/ΔFmax (calculated using HTRF ratio 665 nm/620 nm) versus log[concentration] was used to determine the 50% inhibitory concentrations (IC$_{50}$) of the compounds (see next section on Calculation of IC$_{50}$ values).

To calculate ΔF/ΔFmax, first the HTRF ratio is calculated as follows:

$$HTRF\text{ ratio} = \frac{\text{Signal 665 nm}}{\text{Signal 620 nm}} \times 10000$$

A multiplication factor of 10000 factor was used to not deal with decimal values that improves data accuracy during calculation. The AR ratio indicating "specific signal" of the compound disrupting the PD-1/PD-L1 interaction was calculated by subtracting background HTRF ratio (negative DMSO control in our work) from each compound (sample) HTRF ratio as follows:

ΔR=HTRF ratio (sample)−HTRF ratio (background)

Next, data normalization was done to minimize variation in values on different days, different plate reader instruments, or if the assay was done by different individuals. The normalization was done with respect to the background HTRF ratio and was calculated as follows:

$$\Delta F = \frac{HTRF\text{ ratio (sample)} - HTRF\text{ ratio (background)}}{HTRF\text{ ratio (background)}} \times 100\%$$

Finally, the ΔF/ΔFmax ratio was calculated to enable comparison of values between multiple experiments.

$$\Delta F/\Delta F \max = \frac{\Delta F\text{ (sample)}}{\Delta F \max}$$

wherein ΔF max is taken as the ΔF of the positive DMSO control in the assay.

Calculation of IC$_{50}$ values

The IC$_{50}$ value for PD-1/PD-L1 inhibition was determined by analyzing the log of the concentration—response curves to fit a sigmoid curve with four-parameter logistic (4PL) regression using the GraphPad Prism Software version 8.3.0 for Windows, GraphPad Software, La Jolla California USA, www.graphpad.com. The IC$_{50}$ values are provided in Table 2. Following equation defines the regression curve.

$$Y = \text{Bottom} + \frac{(\text{Top} - \text{Bottom})}{\left(1 + 10^{((Log IC50-X) \times Hill Slope)}\right)}$$

wherein X=Log of concentration, Y=Response ΔF/ΔFmax, Top and Bottom=Plateaus in same units as Y, LogIC50=Same log units as X, HillSlope=Slope factor or Hill Slope, Unitless. Using the above equation, LogIC50, is calculated to obtain the IC$_{50}$ value for each compound. The HTRF_IC50_Data.xlsx data file with all replicates is provided as a Supporting File for use in GraphPad Prism Software to calculate IC$_{50}$ values.

Machine Learning Architecture of the EGNN model

The EGNN model was developed using PyTorch[47]. All scripts for implementing the machine learning model and results are provided on GitHub at https://github.com/chopralab/egnn. The FIG. 1 shows the overview of the EGNN machine learning architecture. We implemented the Graph Neural Networks for the molecular graph by Tsubaki and coworkers.[24] Briefly, the molecular structures were converted into SMILES strings using ChemAxon MolConverter[48] software. Then RDKit[49] software package and the Weisfeiler-Lehman algorithm was used to extract r-radius subgraphs graphs for molecules (FIG. 1A). The following sections include details of the EGNN architecture.

Graph Neural Network for Molecular Graphs in EGNN

The following equations and notations with details for molecular GNN have been reproduced here from the original work[24] with minor modifications for clarification. The lowercase bold face letters (e.g. $\mathbf{v} \in \mathbb{R}^d$) indicate vectors, uppercase bold face letters (e.g. $\mathbf{M} \in \mathbb{R}^{m \times n}$) indicate matrices, and Italicized non-bold letters (e.g. $S$, $G$, $v$, and $e$) indicate scalars, sets, graphs, vertices, and edges. The GNN converts a molecular graph into a low dimensional real valued vector $\mathbf{y} \in \mathbb{R}^d$ with two neural network-based functions; transition and output.[21] In a graph G, each vertex (v) is updated with considering the information of its neighboring vertices and edges by the transition function. These vertices have been mapped into a real valued vector $y \in \mathbb{R}^d$ by the output function. Both functions are differentiable. All the input features and weights of the GNN model are updated using back propagation with the help of the cross-entropy loss function.

A graph can be defined as G=(V, E), here; V and E are sets of vertices and edges respectively. When applied to chemistry, atoms can be defined as vertices and chemical bonds can be defined as edges. First, all the atoms and chemical bonds will be embedded as real valued vectors with d-dimensions based on their different types. Since the diversity of atoms (eg: C, N, O, etc.) and bonds (eg: single bonds, double bonds, triple bonds, etc.) in a small molecule is limited, the number of learning parameters are limited. Therefore, a strategy called r-radius sub-graphs[50] was used to avoid this limitation.

r-radius Sub-Graphs

The set of all atoms within a defined r radius an atom i can be represented as N(i,r). When the r=0, N(i,r)={i}, which is the set of all atoms in the molecule. The r-radius sub-graph of the ith vertex ($v_i$) is defined as follows;

$v_i^{(r)} = (V_i^{(r)} E_i^{(r)})$, wherein, $V_i^{(r)} = (V_i^{(r)}, E_i^{(r)})$, wherein, $V_i^{(r)} = \{v_j | j \in N(i,r)\}$ $E_i^{(r)} = \{e_{mn} \in E | (m,n) \in N(i,r) \times N(i,r-1)\}$ The r-radius sub-graph for the edge between ith and jth atoms ($e_{ij}$) was defined as follows;

$e_{ij}^{(r)} = (V_i^{(r-1)} \cup V_j^{(r-1)}, E_i^{(r-1)} \cap E_j^{(r-1)})$

Randomly initialized embeddings (FIG. 1) are assigned to each r-radius edge $e_{ij}^{(r)}$ and vertex ($v_i^{(r)}$) based on the type. Backpropagation has been used to train these random embeddings.

Vertex Transition Function

Say $v_i^{(t)} \in \mathbb{R}^d$ is the embedded vector for the i th vertex of a given molecular graph G at time step t. Then the updated $v_i^{(t+1)} \in \mathbb{R}^d$ vector can be written as follows;

$$v_i^{(t+1)} = \sigma\left(v_i^{(t)} + \sum_{j \in N(i)} h_{ij}^{(t)}\right)$$

wherein, N(i) is denoting the set of neighboring atoms, $\sigma$ is the sigmoid function which is defined as $$(x) = \frac{1}{1+e^x},$$

and $h_{ij}^{(t)} \in \mathbb{R}^d$ is the hidden vector which defines the neighborhood and can be calculated as follows;

$$h_{ij}^{(t)} = f\left(W_{neighbor}\begin{bmatrix}v_j^{(t)}\\e_{ij}^{(t)}\end{bmatrix} + b_{neighbor}\right)$$

wherein, f is the Rectified Linear Units (ReLU), a non-linear activation function such f(x)=max(0, x). $W_{neighbor} \in \mathbb{R}^{d \times 2d}$ and $b_{neighbor} \in \mathbb{R}^{d \times 2d}$ are the weight matrix and the bias vector respectively. The vector between the ith and jth atoms (vertices) of the molecular graph after the time step t is defined as $e_{ij}^{(t)}$.

Edge Transition Function

As mentioned before, edge transition function is used to update each embedded edge vector $e_{ij}^{(t)}$ during the training process.

$e_{ij}^{(t+1)} = \sigma(e_{ij}^{(t)} + g_{ij}^{(t)})$ $g_{ij}^{(t)} = f(W_{edge}(v_i^{(t)} + v_j^{(t)}) + b_{edge})$ wherein, $W_{edge} \in \mathbb{R}^{d \times d}$, $b_{edge} \in \mathbb{R}^{d \times 1}$ are the weight matrix and the bias vector respectively. Moreover, $v_i^{(t)}$ and $v_j^{(t)}$ are added, because there is no direction for edges in molecular graphs.

Molecular Vector Output of Molecular GNN

The transition function generates an updated set of atom (vertex) vectors ($V = \{v_1^{(t)}, v_2^{(t)}, \ldots, v_{|V|}^{(t)}\}$). Then the output function uses this set of atom vectors to obtain an unique molecular vector $y_{molecule} \in \mathbb{R}^d$ (FIG. 1A), which is defined as follows;

$$y_{molecule} = \frac{1}{|V|}\sum_{i=1}^{|V|} v_i^{(t)}$$

wherein, the total number of vertices in the full molecular graph is denoted by the |V|. Generation of Energy Features with Docking and Energy Vector (E) in EGNN First, all the reported molecules were carefully drawn using MarvinSketch[51] software. Then, all the drawn molecules were cleaned in 3D and converted into a sybyl.mol2 file, which was used for docking with our in-house CANDOCK[31] software package (version 0.6.0) using default parameters with 20,000 max_num_possible and 20% top seed percent (FIG. 1B). CANDOCK source code is available on GitHub at https://github.com/chopralab/candock/releases/tag/v0.6.0. The docking was done with a PD-L1 homodimer crystal structure (PDB ID: 5N2F). We selected the binding site based on the coordinates of the crystal ligand in the protein structure (ligand ID:8HW). Then, radial-mean-reduced-6 (RMR6)[31] was used as "Selector" parameters for docking to select the top pose[31]. Next, the top pose of each docked compound was selected, and its docking score was recalculated using all the available 96 different potential energy functions in CANDOCK[31] software. All 96 CANDOCK docking energy scores of each molecule were normalized for each potential energy function to use as a vector in the EGNN model;

$$\hat{S}_{i,j} = \left(\frac{S_{i,j} - \min(S_j)}{\max(S_j) - \min(S_j)}\right)$$

wherein, i: 1→n and j: 1→m. Here, n is the number of potential energy scoring functions and m is the number of molecules in the dataset. $\hat{S}_{i,j}$ is the normalized docking energy value for the energy score with ith potential energy function for the jth docked molecule. Similarly, $S_{i,j}$ is the docking energy score before normalization. Also, $\max(S_j)$ and $\min(S_j)$ are the maximum and minimum energy values within the jth scoring function for all docked molecules. Then Cohen's Kappa scores were calculated for each scoring function for all the training set data using Cohen_kappa_score tool in scikit-learn package[46]. All the scoring functions which gave a positive Cohen's kappa score were selected and top in each class was selected for the EGNN model. Thus, the normalized docking score vector for each molecule in the EGNN model is represented using RCR15 and RCC15 normalized potential energy scoring functions as $y_{energy} \in \mathbb{R}^2$ (FIG. 1B).

Output of EGNN

As represented in FIG. 1C, the normalized docking energy score vector ($y_{energy}$) is concatenated with the molecular vector output of the GNN ($y_{molecule}$). Then, the concatenated long vector ($y_{molecule} \oplus y_{energy}) \in \mathbb{R}^{(d+96)}$ was used for the training as follows to obtain an output vector $x_{output} \in \mathbb{R}^2$;

$$x_{output} = W_{output}(y_{molecule} \oplus y_{energy}) + b_{output}$$

wherein $\oplus$ denotes concatenation, $W_{output} \in \mathbb{R}^{2 \times (d+96)}$ denotes the weight matrix and the $b_{output} \in \mathbb{R}^2$ denotes the bias vector. Then, a SoftMax classifier (FIG. 1D) is added on to the top of the $x_{output} = [y_0, y_1]$ vector to get the high or low potency probabilities.

$$p_t = \frac{e^{(y_t)}}{\sum_i e^{(y_i)}}$$

wherein, $t \in \{0,1\}$; 0 indicates low potency and 1 indicates high potency, and the $p_t$ is the probability of the given $y_t$.

Bootstrapping the EGNN Model

The model uses a random number to initialize edge and vertex vectors. Therefore, bootstrapping was used with the final model to get predictions. One thousand different models with distinct random seeds were trained and predictions were obtained for an in-house molecular designs test set. Averaged SoftMax scores were used as the final prediction results of the bootstrapped model. Finally, molecules in the synthetic test set were classified as high Potency or low potency based on the averaged SoftMax score. If it is greater or equal to 0.5, it was considered as high Potency, else low potency (FIG. 1). Thus, the EGNN model was trained with back propagation with given SMILES strings, the vectors of RCR15 and RCC15 scores generated by CANDOCK[31] and their high potency or low potency status with the PD-L1 protein. The trained model can be used to predict the probability of a given molecule to be a high or low potent molecule towards the PD-L1 protein.

EGNN Training and Hyperparameter Optimization

The model takes a SMILES string and a docking energy score string for a given molecule as inputs. Hyperparameters of the model were optimized before using it for predictions. Dimension of the GNN hidden vector (dim), number of hidden layers of the GNN, and sub-graph radius was optimized by considering the five-fold cross validated F1 score. Three values were used for the dimension of the GNN hidden molecular vector output (i.e. dim=5,10 and 15). Numbers 1, 2, and 3 were used to check for the optimum number of hidden layers in the GNN. Finally, the optimum sub-graph radius for the model was selected out of radius=1, 2 and 3.

Calculation of the F1 Score and the Cohen's Kappa

Following terms were used to calculate the Cohen's Kappa and the F1 score. The number of compounds predicted to be high potency that experimentally reported to be high potency was considered as true positives (TP). When the number of compounds predicted to be high potency but experimentally reported as low potency in patents were taken as false positives (FP). True negatives (TN) are defined as the number of compounds predicted to be low potency and experimentally reported as low potency as well. Then false negatives (FN) are defined as the number of compounds predicted to be low potency but experimentally reported as high potency. F1 score is defined as follows.

$$F1 \text{ Score} = \frac{2 \cdot \text{precision} \cdot \text{recall}}{\text{precision} + \text{recall}}$$

wherein the precision and recall are defined as follows.

$$\text{precision} = \frac{TP}{TP + FP}$$

$$\text{recall} = \frac{TP}{TP + FN}$$

Cohen's Kappa:

$$\text{Cohen's Kappa} = \frac{P_o - P_e}{1 - P_e}$$

$P_o$=Relative observed agreement among raters $$P_o = \frac{TP + TN}{TP + TN + FP + FN}$$

$P_e$=Probability of random agreement $$P_e = \frac{[TP + FN \quad FP + TN]\begin{bmatrix}TP + FP \\ FN + TN\end{bmatrix}}{(TP + TN + FP + FN)^2}$$

Synthesis

Unless noted otherwise, all reagents and solvents were purchased from commercial sources and used as received. All reactions were performed in a screw-capped vial. The proton ($^1$H) and carbon ($^{13}$C) NMR spectra were obtained using a 500 MHz using $Me_4Si$ as an internal standard and are reported in δ units. Coupling constants (J values) are reported in Hz. Column chromatography was performed on silica gel using flash chromatography (Teledyne ISCO EZprep). High-resolution mass spectra (HRMS) were obtained using the electron spray ionization (ESI) technique and as TOF mass analyzer. Organic solvents and starting materials were used as received. The BMS compound 4a (BMS-1 or KPGC01S94)[7] as well as compounds 4b-c were synthesized according to the reported procedures starting from compound 1, 2a-b, 3a-b and spectral data were in accordance with reported data. [6-8]

Compound 4a (BMS-1 or KPGC01S94), (S)-1-(2,6-dimethoxy-44(2-methyl-[1,1'-biphenyl]-3-yl)methoxy)benzyl) piperidine-2-carboxylic acid: 3b from scheme 1 (45 mg, 0.125 mmol), (S)-piperidine-2-carboxylic acid (64.5 mg, 4 equiv, 0.5 mmol), sodium cyanoborohydride (40.8 mg, 5.2 equiv, 0.65 mmol), were dissolved in DMF (1 mL) and then added acetic acid (2 drops). The reaction mixture was allowed to stir at 80° C. for 1 hour. The reaction was monitored by TLC. The crude was purified by 0-20% DCM:MeOH to afford desire product as an off-white solid (31.5 mg, 53% yield). $^1$H NMR (500 MHz, DMSO-d6) δ 7.49-7.41 (m, 3H), 7.39-7.34 (m, 1H), 7.32-7.25 (m, 3H), 7.19 (dd, J=7.7, 1.5 Hz, 1H), 6.41 (s, 2H), 5.17 (s, 2H), 4.08 (s, 2H), 3.78 (s, 7H), 3.11 (t, J=5.5, 5.5 Hz, 1H), 3.08-2.99 (m, 1H), 2.60 (dd, J=13.5, 6.7 Hz, 1H), 2.20 (s, 3H), 1.80 (q, J=6.0, 5.9, 5.9 Hz, 2H), 1.55 (q, J=6.7, 6.1, 6.1 Hz, 2H), 1.37 (ddt, J=18.4, 12.8, 6.5, 6.5 Hz, 3H); $^{13}$C NMR (126 MHz, DMSO-d$_6$) δ 172.0, 161.47, 160.32, 142.70, 141.85, 135.83, 134.59, 130.25, 129.63, 128.86, 128.72, 127.44, 126.04, 92.05, 69.23, 64.35, 56.42, 48.70, 46.21, 31.16, 26.11, 22.13, 21.27, 16.41.

Compound 4b (KPGC01S32), (4-43-(2,3-dihydrobenzo[b][1,4]dioxin-6-yl)-2-methylbenzypoxy)-2,6-dimethoxybenzyl)-D-serine: 3a from scheme 1 (35.6 mg, 0.104 mmol), D-serine (32.8 mg, 3 equiv), sodium cyanoborohydride (19.6 mg, 3 equiv), were dissolved in DMF (1 mL) and then added acetic acid (0.104 mmol, 1 equiv, 2 drops). The reaction mixture was allowed to stir overnight at room temperature. The reaction was monitored by TLC. The crude was purified by 0-20% MeOH:DCM to afford desire product as an off-white solid (42% yield). $^1$H NMR (500 MHz, DMSO-d$_6$) δ 7.42 (dd, J=7.6, 1.5 Hz, 1H), 7.22 (t, J=7.6, 7.6 Hz, 1H), 7.15 (dd, J=7.6, 1.5 Hz, 1H), 6.90 (d, J=8.2 Hz, 1H), 6.76 (d, J=2.1 Hz, 1H), 6.73 (dd, J=8.2, 2.1 Hz, 1H), 6.37 (s, 2H), 5.13 (s, 2H), 4.26 (s, 4H), 3.86 (s, 2H), 3.77 (s, 6H), 3.58 (dt, J=8.5, 3.4, 3.4 Hz, 2H), 2.94 (t, J=6.0, 6.0 Hz, 1H, NH), 2.20 (s, 3H); $^{13}$C NMR (126 MHz, DMSO-d$_6$) δ 172.85, 160.75, 159.69, 159.53, 143.42, 142.96, 142.12, 135.85, 134.96, 134.65, 130.20, 128.56, 125.93, 122.59, 118.17, 117.26, 104.65, 92.06, 69.18, 64.57, 62.51, 61.34, 56.43, 56.32, 16.41; HRMS (ESI): for $C_{28}H_{32}NO_8[M+H]^+$ found, 510.2132 m/z; calculated mass, 510.2128.

Compound 4c (KPGC01S138), N-(2,6-dimethoxy-4-((2-methyl-[1,1'-biphenyl]-3-yl)methoxy) benzyl)-3,3,3-trifluoro-1-phenylpropan-1-amine: 3b from scheme 1 (8 mg, 0.022 mmol), 3,3,3-trifluoro-1-phenylpropan-1-amine (16.7 mg, 0.088 mmol, 4 equiv), sodium cyanoborohydride (7.2 mg, 0.114 mmol, 5.2 equiv), were dissolved in DMF (0.5 mL) and then added acetic acid (1 drop). The reaction mixture was allowed to stir at 80° C. for 3 hours. The reaction was monitored by TLC. The crude was purified by 0-20% MeOH:DCM to afford desire product as oily product (68% yield). $^1$H NMR (500 MHz, CDCl$_3$) δ 7.45 — 7.38 (m, 5H), 7.38-7.30 (m, 6H), 7.30-7.27 (m, 1H), 7.26 (d, J=5.4 Hz, 1H), 6.22 (s, 2H), 5.08 (s, 2H), 3.96 (t, J=6.5, 6.5 Hz, 1H), 3.75 (s, 6H), 3.73 (d, J=6.5 Hz, 2H), 2.46 (s, 1H), 2.27 (s, 3H), 1.29-1.24 (m, 1H);$^{13}$C NMR (126 MHz, CDCl$_3$) δ 160.23, 159.41, 143.06, 141.94, 135.1, 134.49, 132.81, 130.34, 129.40, 128.49, 128.32, 128.11, 127.91, 127.62, 127.18, 126.90, 125.65, 91.17, 69.34, 56.21, 55.53, 39.11, 16.23; HRMS (ESI): for $C_{32}H_{33}F_3NO_3[M+H]^+$ found, 536.2419 m/z; calcd mass, 536.2413.

Compound 4d (GCL.2), (7R,8R,9S,13S,14S,17R)-17-ethynyl-17-hydroxy-7,13-dimethyl-1,2,6,7,8,9,10,11,12,13,14,15,16,17-tetradecahydro-3H-cyclopenta[a]phenanthren-3-one: Tibolone (156 mg, 0.5 mmol) was taken in a round bottom flask containing 10 mL of THF and 100 μL of water was added. Next, p-toluene sulfonic acid (85 mg, 0.5 mmol) was added to it and the mixture was refluxed at 80° C. for 48 hours and the progress of the reaction was monitored by TLC. The organic solvent was then evaporated to dryness to get the crude product, which was purified by flash column chromatography using 20% ethyl acetate in pet-ether solvent mixture as eluent to give off-white solid pure compound GCL2 (53% yield). $^1$H NMR (500 MHz, MeOD) δ 5.80 (t, J=2.1, 2.1 Hz, 1H), 2.88 (s, 1H), 2.56 (ddt, J=14.1, 5.4, 1.6, 1.6 Hz, 1H), 2.42-2.28 (m, 4H), 2.27-2.19 (m, 1H), 2.18-2.13 (m, 1H), 2.06-1.90 (m, 3H), 1.77-1.53 (m, 6H), 1.44-1.25 (m, 2H), 1.14 (qd, J=11.0, 11.0, 10.9, 4.2 Hz, 1H), 0.91 (d, J=0.7 Hz, 3H), 0.79 (d, J=7.1 Hz, 3H). $^{13}$C NMR (126 MHz, MeOD) δ201.06, 167.84, 125.32, 87.28, 78.82, 73.45, 48.12, 47.95, 47.78, 47.61, 47.44, 47.27, 47.10, 46.67, 45.82, 43.05, 42.76, 42.18, 38.28, 36.02, 32.25, 30.66, 26.44, 26.41, 21.71, 11.79, 11.77.

Compound 4e (KPGC01342), (S)-1-(2,6-dimethoxy-4-((2-methyl-[1,1'-biphenyl]-3-yl)methoxy)benzyl)piperidine-3-carboxylic acid: 3b from scheme 1 (24 mg, 0.0066 mmol), (D)-Nipecotic acid (34.2 mg, 0.0265 mmol, 4 equiv), sodium cyanoborohydride (5.2 mg, 0.0343 mmol, 5.2 equiv), were dissolved in DMF (1 mL) and then added acetic acid (1 drop). The reaction mixture was allowed to stir at room temperature for 14 hours. The reaction was monitored by TLC (Silica, 5% DCM:MeOH. The crude was purified by flash chromatography using 0-20% DCM:MeOH to afford desire product as oily product (43% yield). $^1$H NMR (500 MHz, DMSO): δ 7.49-7.41 (m, 3H), 7.39-7.34 (m, 1H), 7.32-7.25 (m, 3H), 7.19 (d, J=7.7 Hz, 1H), 6.37 (s, 2H), 5.15 (s, 2H), 3.75 (s, 6H), 3.53 (s, 2H), 2.38-2.30 (m, 2H), 2.20 (s, 3H), 1.97 (s, 4H), 1.16 (s, 2H); $^{13}$C NMR (126 MHz, DMSO): δ 170.81, 160.50, 160.06, 142.67, 141.87, 135.99, 134.56, 130.18, 129.63, 128.81, 128.71, 127.42, 126.01, 92.00, 69.09, 60.22, 56.27, 55.37, 55.04, 52.65, 49.05, 31.14, 26.68, 21.21, 16.40, 14.54; LCMS/MS (ESI): for $C_{29}H_{33}NO_5[M+H]^+$ found, 476.3 m/z; calculated mass, 476.24.

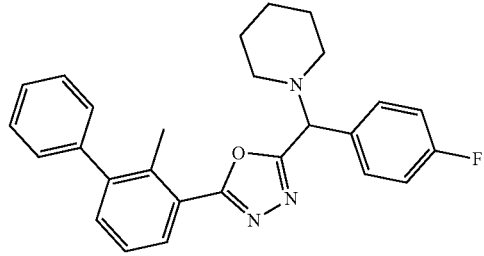

2a

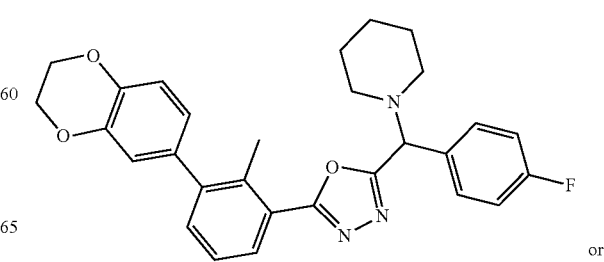

2b or

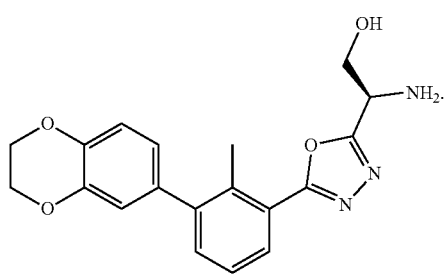

Synthesis of 2a:

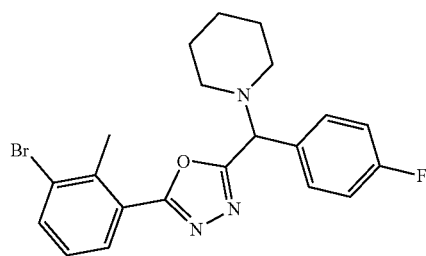 [SMILES: Cc1c(Br)cccc1-c1nnc(C(c2ccc(F)cc2)N2CCCCC2)o1]

Step-1: 2-(3-bromo-2-methylphenyl)-5-((4-fluorophenyl) (piperidin-1-yl)methyl)-1,3,4-oxadiazole: In a clean dried screw cap vial with magnetic stir bar, a mixture of piperidine (1 equiv), 4-fluorobenzaldehyde (1 equiv), N-(isocyanoimino) triphenyl phosphorane (1 equiv) was dissolved in DCM (5 mL/mmol). The solution of 3-bromo-2-methylbenzoic acid (1 equiv) in DCM was added slowly to the reaction mixture at room temperature and allowed to stir at 50-60° C. for 2 hours. The solvent was removed in vacuo and crude was purified by flash chromatography using Hexane: Ethylacetate (0-60%) as an eluent to get light yellow oily product.

Step-2: 2-((4-fluorophenyl)(piperidin-1-yl)methyl)-5-(2-methyl-[1,1'-biphenyl]-3-yl)-1,3,4-oxadiazole (2a): In a clean dried screw cap vial with magnetic stir bar, a mixture of 2-(3-bromo-2-methylphenyl)-5-((4-fluorophenyl) (piperidin-1-yl)methyl)-1,3,4-oxadiazole (1 equiv), phenylboronic acid (2 equiv) and PdCl$_2$(dppf)$_2$-CH$_2$Cl$_2$ (3 mol %) were taken and purged once with Argon. The toluene (4.5 mL) as well as ethanol (1.5 mL) were added and purge the reaction mixture with Argon. Add 1.5 mL 1M NaHCO$_3$ while purging and allow to stir at 80° C. for 45 minutes. The reaction progress was monitored by TLC. Upon completion of reaction, add ethyl acetate (20 mL) and wash with water (2×20 mL). The organic solvent was removed under reduced pressure and crude was purified by flash chromatography (0-60%, Hexane: Ethylacetate) to get transparent oily product.

Synthesis of 2b

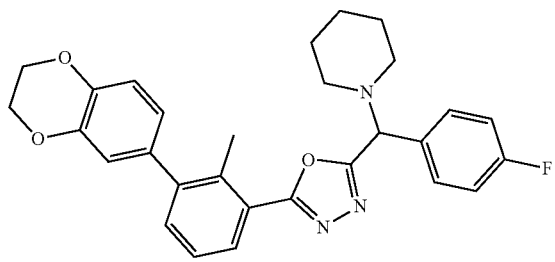

In a clean dried screw cap vial with magnetic stir bar, a mixture of 2-(3-bromo-2-methylphenyl)-5-((4-fluorophenyl) (piperidin-1-yl)methyl)-1,3,4-oxadiazole (1 equiv), (2,3-dihydrobenzo [b] [1,4]dioxin-6-yl)boronic acid (2 equiv) and PdCl$_2$(dppf)$_2$-CH$_2$Cl$_2$ (3 mol %) were taken and purged once with Argon. The toluene (4.5 mL) as well as ethanol (1.5 mL) were added and purge the reaction mixture with Argon. Add 1.5 mL 1M NaHCO$_3$ while purging and allow to stir at 80° C. for 45 minutes. The reaction progress was monitored by TLC. Upon completion of reaction, add ethyl acetate (20 mL) and wash with water (2×20 mL). The organic solvent was removed under reduced pressure and crude was purified by flash chromatography (0-60%, Hexane: Ethylacetate) to get transparent oily product.

Synthesis of 2c

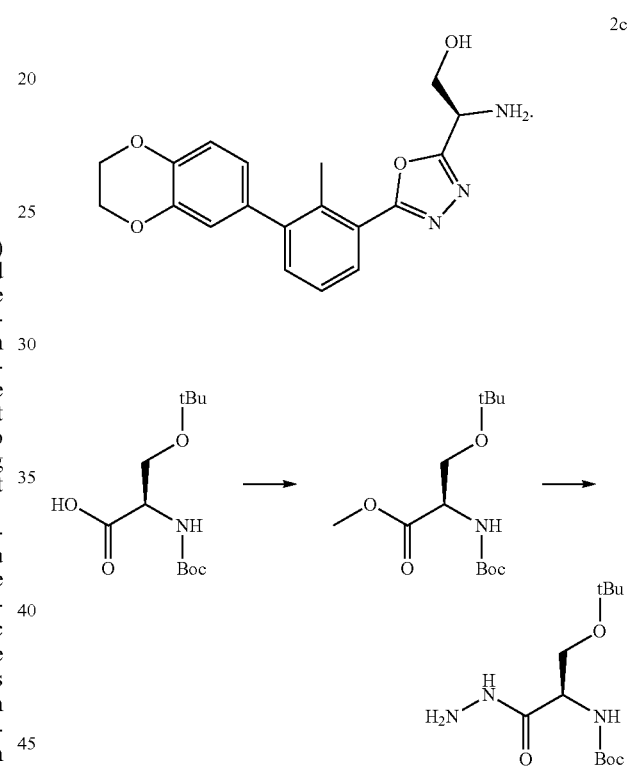

Preparation of methyl N-(tert-butoxycarbonyl)-O-(tert-butyl)-D-serinate: A mixture of Boc-D-serine (1 eq), iodomethane (3 equiv) in DMF was stirred at room temperature for 2 hours. The ice-cold water was added to the reaction mixture and extracted with ethyl acetate. Then, organic layer was washed with water and ethyl acetate was removed in vacuo. The oily crude product was obtained quantitatively, and it used for the next step without further purification.

Preparation of tert-butyl (R)-(3-(tert-butoxy)-1-hydrazineyl-1-oxopropan-2-yl)carbamate: Hydrazine monohydrate (2 equiv) was added slowly to a mixture of methylester of Boc-D-serine (1 eq) in DCM kept in ice-bath. It was stirred at room temperature for 2 hours until white suspension was observed. The ice-cold water was added to the reaction mixture and extracted with ethyl acetate. Then, organic layer was washed with water and ethyl acetate was removed in vacuo. The white solid product was obtained quantitatively, and it used for the next step without further purification.

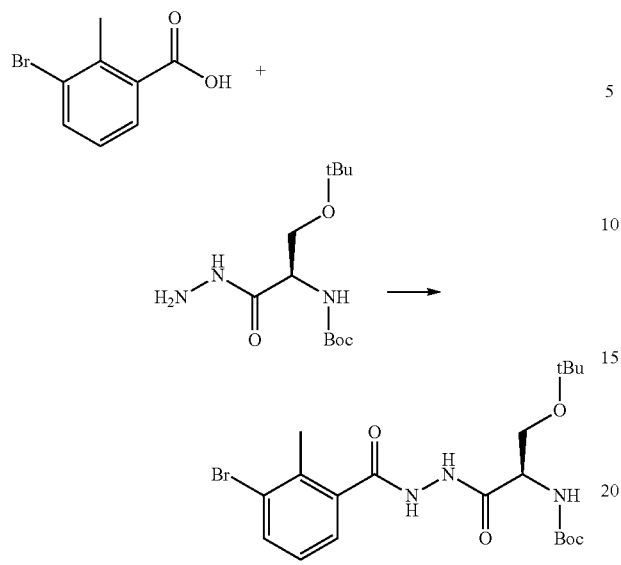

A mixture of 3-Bromo-2-methyl benzoic acid (1 equiv), EDCI (1.5 equiv), DIPEA (5 equiv) in DMF was stirred for 10 minutes and then tert-butyl (R)-(3-(tert-butoxy)-1-hydrazineyl-1-oxopropan-2-yl)carbamate (1 equiv) was added to the reaction mixture. It was allowed to stir at room temperature overnight. The reaction was monitored by TLC. The crude was extracted with Ethylacetate: ice-cold water and ethyl acetate layer was removed under reduced pressure. The product was purified by flash column chromatography using 0-60% Hexane: Ethylacetate to get white-solid (65% yield).

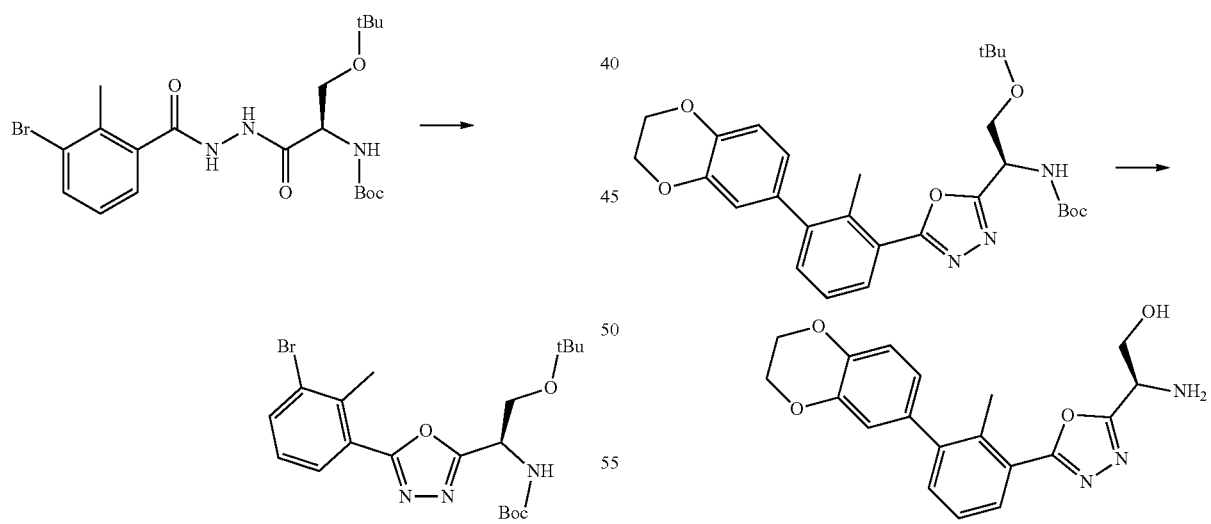

A mixture of tert-butyl (R)-(1-(2-(3-bromo-2-methylbenzoyl)hydrazineyl)-3-(tert-butoxy)-1-oxopropan-2-yl)carbamate (1 eq, 0.5 mmol), PPh$_3$ (1.1 equiv), iodine (2 equiv), triethylamine (2 eq) in THF (5 mL) was stirred at room temperature overnight. The reaction was monitored by TLC. The product was purified by flash column chromatography using 0-60% Hexane: Ethylacetate to get oily product (78% yield).

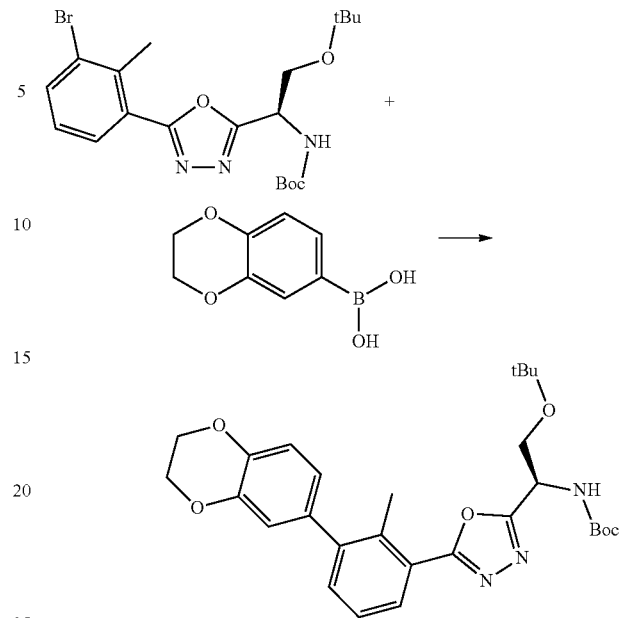

A mixture of tert-butyl (R)-(1-(5-(3-bromo-2-methylphenyl)-1,3,4-oxadiazol yl)-2-(tert-butoxy)ethyl)carbamate (1 equiv), (2,3-dihydrobenzo [b][1,4]dioxin-6-yl)boronic acid (1.5 equiv), PdCl$_2$(dppf).CH$_2$Cl$_2$ (3 mol %) in Toluene: Ethanol (1.5:0.5 mL) and purged twice with Argon. 1M NaHCO$_3$ (1.5 mL) was added under inert atmosphere and it was allowed to stir at 80° C. for 45 mins. The reaction was monitored by TLC. The product was purified by flash column chromatography using 0-60% Hexane: Ethylacetate to get oily product (63% yield).

To a solution of tert-butyl (R)-(2-(tert-butoxy)-1-(5-(3-(2, 3-dihydrobenzo [b][1,4]dioxin-6-yl)-2-methyl phenyl)-1,3, 4-oxadiazol-2-yl)ethyl)carbamate (50 mg) in DCM (2 mL), trifluoroacetic acid (0.5 mL) was added and allowed to stir at room temperature for 3 hours. The reaction was monitored by TLC. The product was purified by flash column chromatography using 0-50% DCM: Methanol to get oily product (88% yield).

(IIIa)

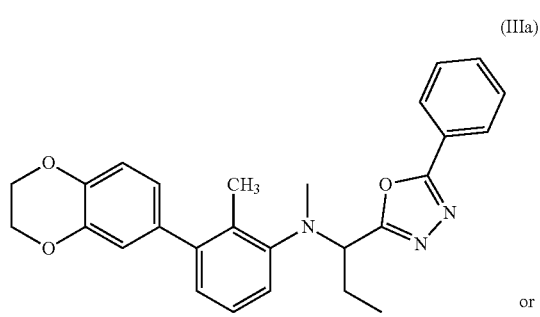

or (IIIb)

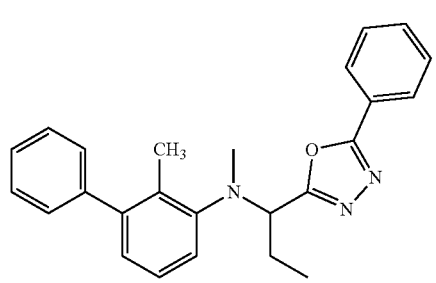

Synthesis of (IIIa)

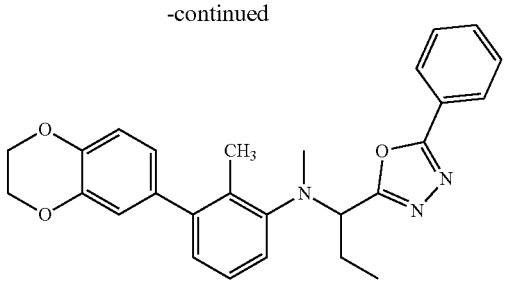

Step-2: A mixture of 3-(2,3-dihydrobenzo[b][1,4]dioxin-6-yl)-N,2-dimethylaniline (1 equiv), propionaldehyde (1.1 equiv), (N-Isocyanoimino)triphenylphosphorane in DCM was added benzoic acid (1.1 equiv) in portions. The reaction mixture was stirred at 40° C. for 2-3 hours. The reaction was monitored by TLC. The product was purified by flash column chromatography using 0-60% Hexane: Ethylacetate to get oily product (54% yield).

Synthesis of (IIIb)

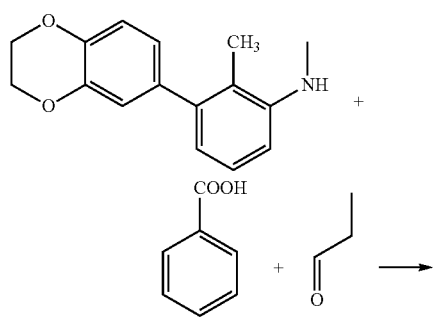

Step-1: 3-Bromo-N,2-dimethylaniline (1 equiv), phenylboronic acid (1.5 equiv), PdCl$_2$(dppf).CH$_2$Cl$_2$ (3 mol %) in Toluene: Ethanol (1.5:0.5 mL) and purged twice with Argon. 1M NaHCO$_3$ (1.5 mL) was added under inert atmosphere and it was allowed to stir at 80° C. for 45 mins. The reaction was monitored by TLC. The product was purified by flash column chromatography using 0-60% Hexane: Ethylacetate to get oily product (74% yield).

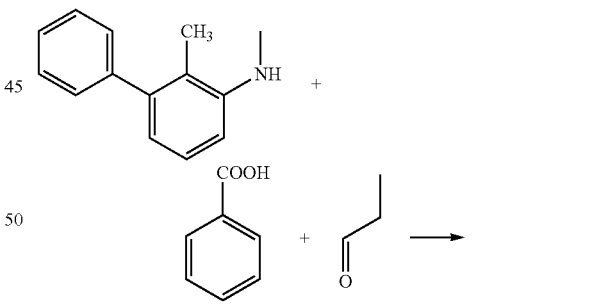

Step-1: 3-Bromo-N,2-dimethylaniline (1 equiv), (2,3-dihydrobenzo[b][1,4]dioxin-6-yl)boronic acid (1.5 equiv), PdCl$_2$(dppf)CH$_2$Cl$_2$ (3 mol %) in Toluene:Ethanol (1.5:0.5 mL) and purged twice with Argon. 1M NaHCO$_3$ (1.5 mL) was added under inert atmosphere and it was allowed to stir at 80° C. for 45 mins. The reaction was monitored by TLC. The product was purified by flash column chromatography using 0-60% Hexane: Ethylacetate to get oily product (77% yield).

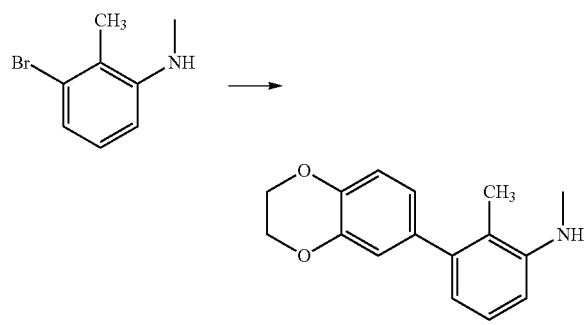

Step-2: A mixture of N,2-dimethyl-[1,1'-biphenyl]-3-amine (1 equiv), propionaldehyde (1.1 equiv), (N-Isocyanoimino)triphenylphosphorane in DCM was added benzoic acid (1.1 equiv) in portions. The reaction mixture was stirred at 40° C. for 2-3 hours. The reaction was monitored by TLC. The product was purified by flash column chromatography using 0-60% Hexane: Ethylacetate to get oily product (48% yield).

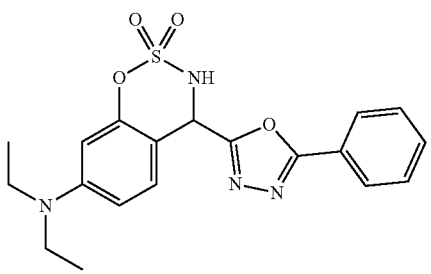, 4a

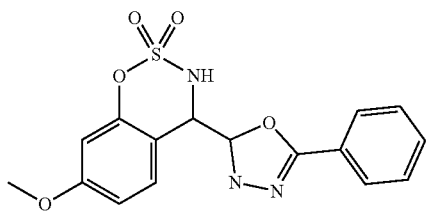, 4b

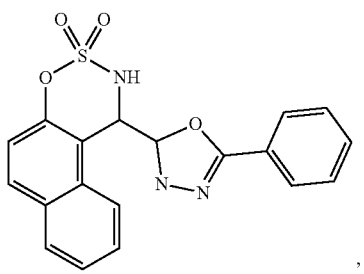, 4c

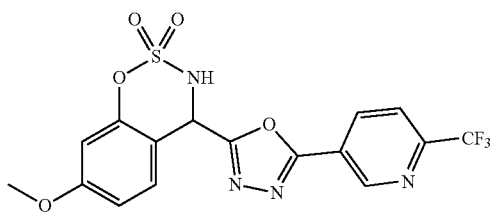, 4d

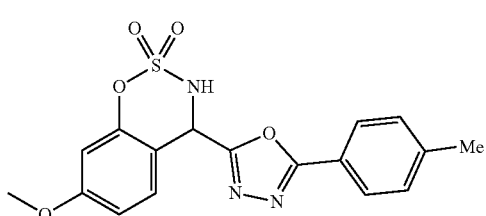

or 4f

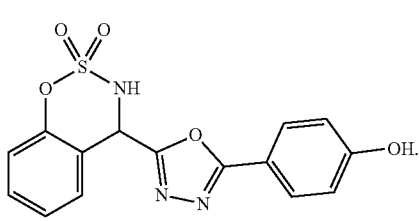.

Representative procedure: 4-(5-phenyl-1,3,4-oxadiazol-2-yl)-3,4-dihydrobenzo[e][1,2,3] oxathiazine 2,2-dioxide [Formula IV derivatives]:

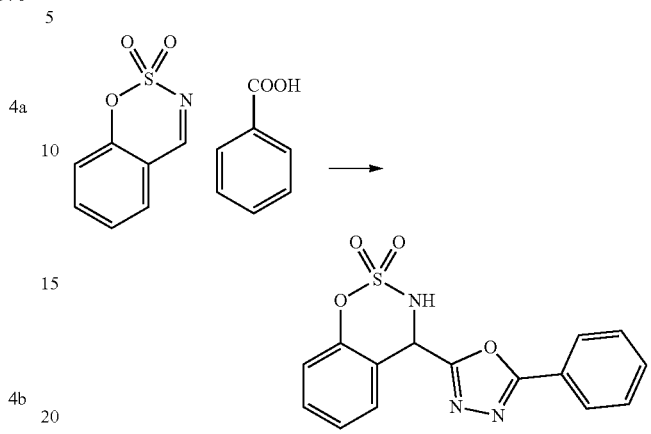

In a clean oven dried screw cap vial, sulfonylimine 1a (0.2 mmol), benzoic acid (1.1 equiv), (N-Isocyanoimino)triphenylphosphorane (1.1 equiv) were taken and cooled to −10° C. Next, solvent $CH_2Cl_2$ (3 mL) was added and allowed to stir at the same temperature for 5-10 minutes. The solvent was partially removed under reduced pressure and the crude was loaded directly onto Silica cartridge and purified by flash chromatography (Teledyne ISCO) using EtOAc: Hexane as an eluent. The major fraction was collected and re-purified by reverse phase prep-HPLC (Teledyne ISCO) using Water: MeCN as an eluent.

A compound having formula V:

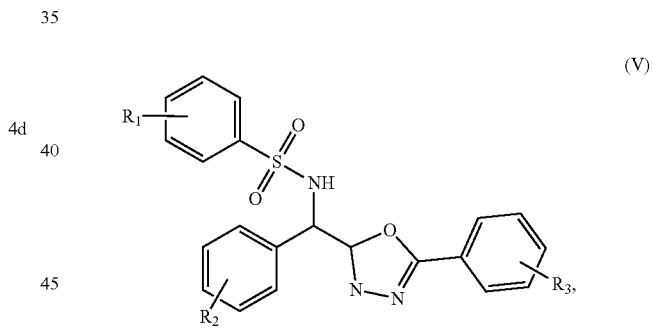

The compound according to formula (V), wherein:
When $R_1=CH_3$, the compounds are

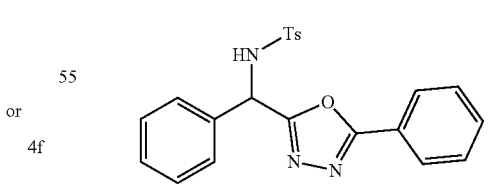 5a

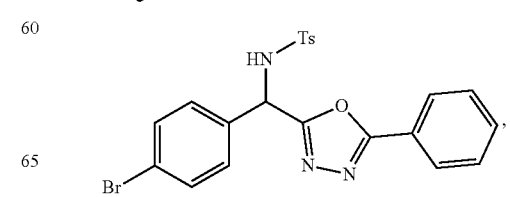, 5b

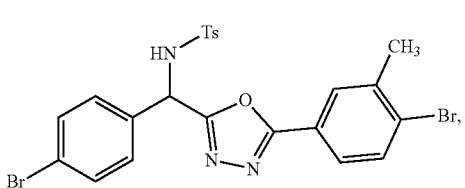

5c

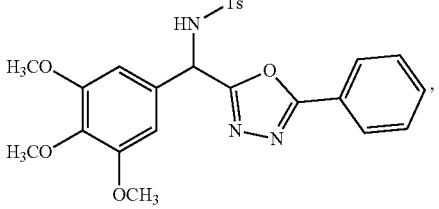

5d

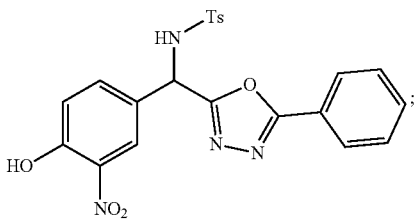

5e

When R₁=Cl, the compounds are

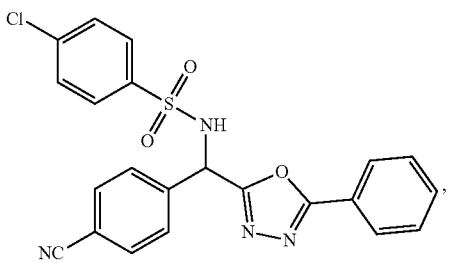

5f

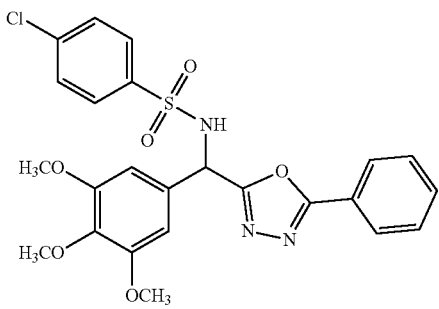

5g

Representative procedure for the synthesis of 4-methyl-N-(phenyl(5-phenyl-1,3,4-oxadiazol-2-yl)methyl) benzenesulfonamide [formula V derivatives]: In a clean oven dried screw cap vial, N-tosylimine (0.2 mmol), benzoic acid (1.1 equiv), (N-Isocyanoimino)triphenylphosphorane (1.1 equiv) were taken and cooled to −10° C. Next, solvent $CH_2Cl_2$ (3 mL) was added and allowed to stir at the same temperature for 5-10 minutes. The solvent was partially removed under reduced pressure and the crude was loaded directly onto Silica cartridge and purified by flash chromatography (Teledyne ISCO) using EtOAc: Hexane as an eluent to get solid product.

Those skilled in the art will recognize that numerous modifications can be made to the specific implementations described above. The implementations should not be limited to the particular limitations described. Other implementations may be possible.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected. It is intended that the scope of the present methods and apparatuses be defined by the following claims. However, it must be understood that this disclosure may be practiced otherwise than is specifically explained and illustrated without departing from its spirit or scope.

REFERENCES (1) Pardoll, D. M. The Blockade of Immune Checkpoints in Cancer Immunotherapy. *Nat. Rev. Cancer* 2012, 12 (4), 252-264.
(2) Buchbinder, E. I.; Desai, A. CTLA-4 and PD-1 Pathways Similarities, Differences, and Implications of Their Inhibition. *American Journal of Clinical Oncology: Cancer Clinical Trials.* Wolters Kluwer Health 2016, pp 98-106.
(3) Sasikumar, P. G. N.; Ramachandra, M.; Naremaddepalli, S. S. S. 1, 2, 4-Oxadiazole Derivatives as Immunomodulators. Google Patents September 2017.
(4) Sunshine, J.; Taube, J. M. Pd-1/Pd-L1 Inhibitors. *Curr. Opin. Pharmacol.* 2015, 23, 32-38.
(5) Imai, K.; Takaoka, A. Comparing Antibody and Small-Molecule Therapies for Cancer. *Nat. Rev. Cancer* 2006, 6 (9), 714-727.
(6) Chupak, L.; Ding, M.; Martin, S.; Connoly, T.; Xu, N.; Yeung, K.; Zhu, J.; Langley, D.; et al. Compounds Useful as Immunomodulators. WO/2015/160641, Oct. 22, 2015.
(7) Chupak, L. S.; Zheng, X.; Mingo, P. A. Compounds Useful as Immunomodulators. WO/2015/034820, Dec. 3, 2015.
(8) Guzik, K.; Zak, K. M.; Grudnik, P.; Magiera, K.; Musielak, B.; Tomer, R.; Skalniak, L.; Dömling, A.; Dubin, G.; Holak, T. A. Small-Molecule Inhibitors of the Programmed Cell Death-1/Programmed Death-Ligand 1 (PD-1/PD-L1) Interaction via Transiently Induced Protein States and Dimerization of PD-L1. *J. Med. Chem.* 2017, 60 (13), 5857-5867.
(9) Zak, K. M.; Grudnik, P.; Guzik, K.; Zieba, B. J.; Musielak, B.; Domling, A.; Dubin, G.; Holak, T. A. Structural Basis for Small Molecule Targeting of the Programmed Death Ligand 1 (PD-L1). *Oncotarget* 2016, 7 (21), 30323-30335.
(10) Broach, J. R.; Thorner, J. High-Throughput Screening for Drug Discovery. *Nature.* [London: Macmillan Journals], 1869-1996, pp 14-16.
(11) Artis, D. R.; Lin, J. J.; et al. Scaffold-Based Discovery of Indeglitazar, a PPAR Pan-Active Anti-Diabetic Agent. *Proc. Natl. Acad. Sci. U.S.A.* 2009, 106 (1), 262-267.
(12) Böhm, H.-J.; Flohr, A.; Stahl, M. Scaffold Hopping. *Drug Discov. today Technol.* 2004, 1 (3), 217-224.
(13) Kitchen, D. B.; Decornez, H.; Furr, J. R.; Bajorath, J. Docking and Scoring in Virtual Screening for Drug Discovery: Methods and Applications. *Nat. Rev. Drug Discov.* 2004, 3 (11), 935-949.
(14) Joachims, T. Text Categorization with Support Vector Machines: Learning with Many Relevant Features. *Lect.*

(15) Burbidge, R.; Trotter, M.; Holden, S. Drug Design by Machine Learning: Support Vector Machines for Pharmaceutical Data Analysis. *Comput. Chem.* 2001, 26 (1), 5-14.
(16) Heikamp, K.; Bajorath, J. Support Vector Machines for Drug Discovery. *Expert Opin. Drug Discov.* 2014.
(17) Breiman, L. Random Forests. *Mach. Learn.* 2001, 9 (1), 5-32.
(18) Li, H.; Leung, K. S.; Wong, M. H.; Ballester, P. J. Improving Autodock Vina Using Random Forest: The Growing Accuracy of Binding Affinity Prediction by the Effective Exploitation of Larger Data Sets. *Mol. Inform.* 2015, 34 (2-3), 115-126.
(19) Zhang, Q. Y.; Aires-de-Sousa, J. Random Forest Prediction of Mutagenicity from Empirical Physicochemical Descriptors. *J. Chem. Inf. Model.* 2007, 47 (1), 1-8.
(20) Torng, W.; Altman, R. B. Graph Convolutional Neural Networks for Predicting Drug-Target Interactions. *J. Chem. Inf. Model.* 2019.
(21) Scarselli, F.; Gori, M.; Tsoi, A. C.; Hagenbuchner, M.; Monfardini, G. The Graph Neural Network Model. *IEEE Trans. Neural Networks* 2009, 20 (1), 61-80.
(22) Lim, J.; Ryu, S.; Park, K.; Choe, Y. J.; Ham, J.; Kim, W. Y. Predicting Drug—Target Interaction Using a Novel Graph Neural Network with 3D Structure-Embedded Graph Representation. *J. Chem. Inf. Model.* 2019, 59 (9), 3981-3988.
(23) Ma, T.; Zhang, A. *AffinityNet: Semi-Supervised Few-Shot Learning for Disease Type Prediction.*
(24) Tsubaki, M.; Tomii, K.; Sese, J. Compound-Protein Interaction Prediction with End-to-End Learning of Neural Networks for Graphs and Sequences. *Bioinformatics* 2019, 35 (2), 309-318.
(25) Gupta, A.; Müller, A. T.; Huisman, B. J. H.; Fuchs, J. A.; Schneider, P.; Schneider, G. Generative Recurrent Networks for De Novo Drug Design. *Mol. Inform.* 2018, 37 (1).
(26) Ståhl, N.; Falkman, G.; Böstrom, J. Deep Reinforcement Learning for Multiparameter Optimization in de Novo Drug Design. *J. Chem. Inf. Model.* 2019.
(27) Li, Y.; Zhang, L.; Liu, Z. Multi-Objective de Novo Drug Design with Conditional Graph Generative Model. *J. Cheminform.* 2018, 10 (1).
(28) Esaki, T.; Ohashi, R.; Watanabe, R.; Natsume-Kitatani, Y.; Kawashima, H.; Nagao, C.; Mizuguchi, K. Computational Model to Predict the Fraction of Unbound Drug in the Brain. *J. Chem. Inf. Model.* 2019.
(29) Fine, J.; Chopra, G. Lemon: A Framework for Rapidly Mining Structural Information from the Protein Data Bank. *Bioinformatics* 2019.
(30) Chopra, G.; Samudrala, R. Exploring Polypharmacology in Drug Discovery and Repurposing Using the CANDO Platform. *Curr. Pharm. Des.* 2016, 22 (21), 3109-3123.
(31) Fine, J.; Konc, J.; Samudrala, R.; Chopra, G. CANDOCK: Chemical Atomic Network Based Hierarchical Flexible Docking Algorithm. *bioRxiv* 2018.
(32) Kischuk, E.; Majumder, J.; Fine, J. A.; Lantz, T. C.; Dhawan, D.; Knapp, D. W.; Ratliff, T. L.; Chopra, G. Abstract 4709: Cell-Specific Gene Program-Based Small-Molecule Immunomodulators Targeting Solid-Tumor Microenvironments; 2018.
(33) Esensten, J. H.; Helou, Y. A.; Chopra, G.; Weiss, A.; Bluestone, J. A. CD28 Co stimulation: From Mechanism to Therapy. *Immunity.* 2016, pp 973-988.
(34) Hernandez-Perez, M.; Chopra, G.; Fine, J.; Conteh, A. M.; Anderson, R. M.; Linnemann, A. K.; Benjamin, C.; Nelson, J. B.; Benninger, K. S.; Nadler, J. L.; et al. Inhibition of 12/15-Lipoxygenase Protects Against β-Cell Oxidative Stress and Glycemic Deterioration in Mouse Models of Type 1 Diabetes. *Diabetes* 2017, 66 (11), 2875-2887.
(35) Ma, X.; Zhou, J.; Wang, C.; Carter-Cooper, B.; Yang, F.; Larocque, E.; Fine, J.; Tsuji, G.; Chopra, G.; Lapidus, R. G.; et al. Identification of New FLT3 Inhibitors Potently Inhibit AML Cell Lines via an Azo Click-It/Staple-It Approach. *ACS Med. Chem. Lett.* 2017, 8 (5).
(36) Fine, J.; Lackner, R.; Samudrala, R.; Chopra, G. Computational Chemoproteomics to Understand the Role of Selected Psychoactives. *Sci. Rep.* 2019.
(37) Lu, L.; Zhang, F.; Li, J.; Wang, H.; Xiao, K.; Wu, L.; Qian, D.-Q.; Lajkiewicz, N.; Konkol, L.; Li, Z.; et al. Heterocyclic Compounds Derivatives as PD-L1 Internalization Inducers. WO/2018/119263, June 28,2018.
(38) Xiao, K.; Zhang, F.; Wu, L.; Yao, W. Heterocyclic Compounds as Immunomodulators. US 2018/0273519 A1, Sep. 27, 2018.
(39) Willett, P Similarity-Based Virtual Screening Using 2D Fingerprints.*Drug Discov. Today* 2006,11 (23-24), 1046-1053.
(40) DeLano, W. L. *Pymol: An Open-Source Molecular Graphics Tool*; CCP4, 2002; Vol. 40.
(41) Max, K.; Weston, S.; Keefer, C.; Engelhardt, A.; Cooper, T.; Mayer, Z.; Kenkel, B.; Team, R. C.; Benesty, M.; Lescarbeau, R.; et al. Classification and Regression Training. 2016, p 198.
(42) Robin, X.; Turck, N.; Hainard, A.; Tiberti, N.; Lisacek, F.; Sanchez, J. C.; Müller, M. PROC: An Open-Source Package for R and S+to Analyze and Compare ROC Curves. *BMC Bioinformatics* 2011, 12 (1), 77.
(43) Guzik, K.; Tomala, M.; Muszak, D.; Konieczny, M.; Hec, A.; Blaszkiewicz, U.; Pustula, M.; Butera, R.; Dömling, A.; Holak, T. A. Development of the Inhibitors That Target the PD-1/PD-L1 Interaction—A Brief Look at Progress on Small Molecules, Peptides and Macrocycles. *Molecules* 2019, 24 (11), 2071.
(44) Zak, K. M.; Kitel, R.; Przetocka, S.; Golik, P.; Guzik, K.; Musielak, B.; Dömling, A.; Dubin, G.; Holak, T. A. Structure of the Complex of Human Programmed Death 1, PD-1, and Its Ligand PD-L1. *Structure* 2015.
(45) Lee, H. T.; Lee, S. H.; Heo, Y. S. Molecular Interactions of Antibody Drugs Targeting PD-1, PD-L1, and CTLA-4 in Immuno-Oncology. *Molecules.* 2019.
(46) Zak, K. M.; Grudnik, P.; Magiera, K.; Holak, T. A. Structural Biology of the Immune Checkpoint Receptor PD-1 and Its Ligands PD-L1/PD-L2. *Structure.* 2017.
(47) PyTorch Community. Tensors and Dynamic Neural Networks in Python with Strong GPU Acceleration. *Github* 2016, 6.
(48) Chemaxon, M. Molecule File Converter, V. 5.10. 1,(C) 1999— 2012 ChemAxon Ltd.
(49) Landrum, G. A. RDKit: Open-Source Cheminformatics.
(50) Costa, F.; De Grave, K. Fast Neighborhood Subgraph Pairwise Distance Kernel. In *ICML 2010—Proceedings, 27th International Conference on Machine Learning*; Omnipress: Madison, WI, USA, 2010; pp 255-262.
(51) Csizmadia, P. MarvinSketch and MarvinView: Molecule Applets for the World Wide Web. In *Proceedings of*

*ECSOC*-3, *the third international electronic conference on synthetic organic chemistry*, September 1q30; 2019; p 1775.

The invention claimed is:

1. A compound having the formula (I):

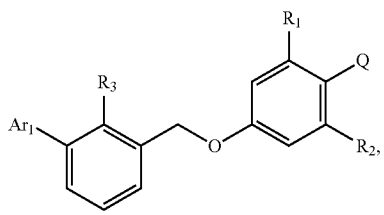

or a pharmaceutically acceptable salt thereof, wherein
Ar₁ is 2,3-dihydrobenzo [b] [1,4]-dioxinyl;
R₁ and R₂ are each, independently, alkyloxy;
R₃ is alkyl; and
Q is

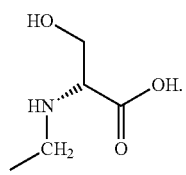

2. The compound according to claim 1, or a pharmaceutically acceptable salt thereof, wherein R₁ and R₂ are each methoxyl.

3. The compound according to claim 1, or a pharmaceutically acceptable salt thereof, wherein R₃ is CH₃.

4. The compound according to claim 1, or a pharmaceutically acceptable salt thereof, wherein the compound is:

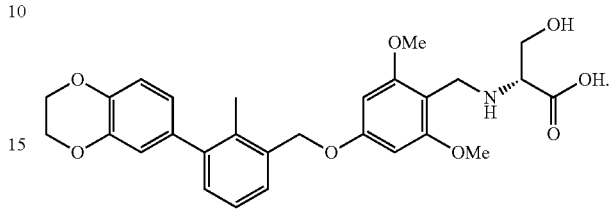

5. A pharmaceutical composition comprising one or more compounds of claim 1, or a pharmaceutically acceptable salt thereof, together with one or more diluents, excipients or carriers.

6. A method for treating a cancer patient, which method comprises administering a therapeutically effective amount of one or more compounds of claim 1, or a pharmaceutical composition comprising same and one or more carriers, diluents, or excipients, to the cancer patient.

7. The method according to claim 6, wherein said cancer is castration-resistant prostate cancer.

* * * * *